US006341257B1

(12) United States Patent
Haaland

(10) Patent No.: US 6,341,257 B1
(45) Date of Patent: Jan. 22, 2002

(54) HYBRID LEAST SQUARES MULTIVARIATE SPECTRAL ANALYSIS METHODS

(75) Inventor: David M. Haaland, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/518,773

(22) Filed: Mar. 3, 2000

Related U.S. Application Data

(60) Provisional application No. 60/123,020, filed on Mar. 4, 1999, and provisional application No. 60/123,114, filed on Mar. 5, 1999.

(51) Int. Cl.[7] ............................................. G06F 19/00
(52) U.S. Cl. ............................ 702/27; 702/22; 702/30; 702/32; 703/12
(58) Field of Search ..................... 702/191, 19, 21–23, 702/27, 28, 30–32, 75–78, 85, 86, 179–181, 183, 189, 194, 196, FOR 103, FOR 104, FOR 107, FOR 108, FOR 115–FOR 119, FOR 131, FOR 134, FOR 156–FOR 163, FOR 165, FOR 166, FOR 168–FOR 173; 356/346, 300–303, 306, 326, 36; 700/266–269; 703/11, 12; 706/924; 436/8, 43, 149, 150, 805, 806, 808, 171, 174; 422/50, 62, 68.1, 70, 82.01, 82.05, 82.09, 82, 89; 250/339.08, 339.09, 338.5, 338.1, 339.07, 341.1, 339.11–339.14, 341.5, 341.8; 73/23.36, 23.37, 23.41, 24.02

(56) References Cited

U.S. PATENT DOCUMENTS 5,435,309 A * 7/1995 Thomas et al. ............ 356/300
5,606,164 A * 2/1997 Price et al. ............ 250/339.09
5,610,836 A * 3/1997 Alsmeyer et al. ............. 702/27
5,724,268 A * 3/1998 Sodickson et al. ............ 702/27
6,031,232 A * 2/2000 Cohenford et al. .... 250/339.12

OTHER PUBLICATIONS

Wentzell et al., "Maximum Likelihood Multivariate Calibration," Anal. Chem 69, 22 99, pp. 2299–2311, Jul. 1979.*

Wentzell et al., "Maximum Likelihood Principal Component Analysis," Journal of Chemometrics, 339, pp. 339–366, 1997 (No month).*

(List continued on next page.)

*Primary Examiner*—Hal Wachsman
(74) *Attorney, Agent, or Firm*—Kevin W. Bieg; Gregory A. Cone; George H. Libman

(57) ABSTRACT

A set of hybrid least squares multivariate spectral analysis methods in which spectral shapes of components or effects not present in the original calibration step are added in a following estimation or calibration step to improve the accuracy of the estimation of the amount of the original components in the sampled mixture. The "hybrid" method herein means a combination of an initial classical least squares analysis calibration step with subsequent analysis by an inverse multivariate analysis method. A "spectral shape" herein means normally the spectral shape of a non-calibrated chemical component in the sample mixture but can also mean the spectral shapes of other sources of spectral variation, including temperature drift, shifts between spectrometers, spectrometer drift, etc. The "shape" can be continuous, discontinuous, or even discrete points illustrative of the particular effect.

19 Claims, 14 Drawing Sheets

OTHER PUBLICATIONS

D. M. Haaland, "Multivariate Calibration Methods Applied to Quantitative FT–IR Analyses," Chapter 8 in *Practical Fourier Transform Infrared Spectroscopy*, J. R. Ferraro and K. Krishnan, Editors, Academic Press, New York, pp. 396–468, (1989), (No month).

D. M. Haaland and E. V. Thomas, "Partial Least–Squares Methods for Spectral Analyses 1: Relation to Other Multivariate Calibration Methods and the Extraction of Qualitative Information," Analytical Chemistry 60, 1193–1202 (1988), Jun. 1988.

D. M. Haaland, R. G. Easterling, and D. A. Vopicka, "Multivariate Least–Squares Methods Applied to the Quantitative Spectral Analysis of Multicomponent Samples," Applied Spectroscopy 39, 73–84 (1985) (No month).

D. M. Haaland and R. G. Easterling, "Improved Sensitivity of Infrared Spectroscopy by the Application of Least Squares Methods," Applied Spectroscopy 34, 539–548 (1980). (No month).

D. M. Haaland and R. G. Easterling, "Application of New Least Squares Methods for the Quantitative Infrared Analysis of Multicomponent Samples," Applied Spectroscopy 36, 665–673 (1982). (No month).

A. Lorber, Error Propagation and Figures of Merit for Quantification by Solving Matrix Equations, Anal. Chem. 58 May 1986, pp. 1167–1172.

D. M. Haaland and D. K. Melgaard, "New Prediction–Augmented Classical Least Squares (PACLS) Methods: Application to Unmodeled Interferents," submitted to Appl. Spectrosc. (Feb. 2000), pp. 1–39.

"Multivariate Calibration Based on the Linear Mixture Model" pp. 166–214. (No date).

D. M. Haaland, "Methods to Include Beer's Law Nonlinearities in Quantitative Spectral Analysis," in ASTM Special Technical Publication, *Computerized Quantitative Infrared Analysis*, G. L. McClure, Editor, STP 934, 78–94 (1987) (No month).

H. Martens and T. Naes, "Multivariate Calibration by Data Compression," in Near–infrared Technology in Agricultural and Food Industries, Ed. P, C. Williams and K. Norris, Am. Assoc. Cereal Chem. St. Paul Minnesota, 57–87 (1987). (No month).

"Orthogonal Decomposition in Certain Elementary Orthogonal Transformations," pp. 9–17 (No date).

W. Windig, "Spectral data files for self–mideling curve resolution with examples using the SIMPLISMA approach," Chemom. and Intell. Lab. Syst. 36, 3–16, 1997 (No month).

R. Tauler, A. Smilde, and B. Kowalski, "Selectivity, Local Rank, Three–Way Data Analysis and Ambiguity in Multivariate Curve Resolution," J. Chemom. 9, 31–56, 1995) (No month).

J. W. Boardman, F. A. Kruxe & R. O. Green, "Mapping Target Signatures Via Partial Unmixing of a Viris Data," pp. 23–26.(No date).

D. M. Haaland, L. Han, and T. M. Niemczyk, "Enhancing IR Detection Limits for Trace Polar Organics in Aqueous Solutions with Surface–Modified Sol–gel–coated ATR Sensors," Applied Spectroscopy 53, 390–395 (1999). (No month).

D. M. Haaland and E. V. Thomas, "Partial Least–Squares Methods for Spectral Analyses. 2. Application to Simulated and Glass Spectral Data," Jun. 1988, pp. 1–7.

D. M. Haaland, "Quantitative Infrared Analysis of Borophophosilicae Films Using Multivariate Statistical Methods," 1988,(No month), pp. 1–10.

E. V. Thomas and D. M. Haaland, "Comparison of Multivariate Calibration Methods for Quantitative Spectral Analysis," May 1990, pp. 1091–1099.

\* cited by examiner

HYBRID LEAST SQUARES MULTIVARIATE SPECTRAL ANALYSIS METHODS

CROSS-REFERENCE TO RELATED APPLICATIONS

This application is related to SD-6227 "Improved Classical Least Squares Multivariate Spectral Analysis" a pending application filed on Mar. 3, 2000 and bearing U.S. Ser. No. 09/518,351, previously filed as Provisional Application Serial No. 60/123,020 on Mar. 4, 1999. The present application was previously filed as Provisional Application Ser. No. 60/123,114 on Mar. 5, 1999.

STATEMENT REGARDING FEDERALLY FUNDED RESEARCH

This invention was made with Government support under Contract DE-AC04-94AL85000 awarded by the U.S. Department of Energy. The Government has certain rights in the invention.

BACKGROUND OF THE INVENTION

This invention relates to methods for performing multivariate spectral analyses. More particularly, this invention relates to such methods which combine various features of both classical least squares analysis and the more modern inverse analysis methods such as partial least squares and principle components regression. The method may further include improved prediction ability enabled by adding spectral shapes (or selected spectral intensity data) for certain chemicals or other factors that affect the spectral response that may not have been present when spectral calibration data were obtained.

Classical least squares (CLS) quantitative multivariate calibration methods are based on an explicit or hard physical model (e.g., Beer's law), (see D. M. Haaland, "Multivariate Calibration Methods Applied to Quantitative FT-IR Analyses," Chapter 8 in *Practical Fourier Transform Infrared Spectroscopy*, J. R. Ferraro and K. Krishnan, Editors, Academic Press, New York, pp. 396–468, (1989)). During calibration, the CLS method has the advantage that least-squares estimates of the pure-component spectra are obtained from mixture samples. Therefore, significant qualitative spectral information can be obtained from the CLS method about the pure-component spectra as they exist in the calibration mixtures. In addition, the method is readily understood, simple to apply, and when the model is valid, CLS requires fewer calibration samples than the popular inverse-based partial least squares (PLS) and principal component regression (PCR) factor analysis multivariate methods, (see D. M. Haaland and E. V. Thomas, "Partial Least-Squares Methods for Spectral Analyses 1: Relation to Other Multivariate Calibration Methods and the Extraction of Qualitative Information," Analytical Chemistry 60 1193–1202 (1988)). However, CLS is more restrictive than inverse methods such as PLS and PCR, since CLS methods require that information be known about all spectral sources of variation in the samples (i.e., component concentrations and/or spectral shapes must be known, estimated, or derived). Inverse multivariate methods such as PLS and PCR can empirically model interferences and can approximate nonlinear behavior though their inverse soft-modeling approach.

BRIEF SUMMARY OF THE INVENTION

A method for estimating the quantity of at least one known constituent or property in a sample comprising first forming a classical least squares calibration model to estimate the responses of individual pure components of at least one of the constituents or parameters affecting the optical response of the sample and employing a cross validation of the samples in the calibration data set, then measuring the response of the mixture to the stimulus at a plurality of wavelengths to form a prediction data set, then estimating the quantity of one of the known constituents or parameters affecting the calibration data set by a classical least squares analysis of the prediction data set wherein such analysis produces residual errors, and then passing the residual errors to a partial least squares, principal components regression, or other inverse algorithm to provide an improved estimate of the quantity of the one known constituent or parameter affecting the sample. The estimation can be repeated for more of the known constituents in the calibration data set by repeating the last two steps for the other constituents or parameters. Overfitting of the prediction data set by the factor analysis algorithm can be minimized by using only factors derived from each step of the cross validation that are most effective in identifying the constituent or parameter. Also, the accuracy and precision of the classical least square estimation or prediction ability can be improved by adding spectral shapes to either or both of the calibration step or the prediction step that describe the effects on the sample response from constituents that are present in the sample or parameters that affect the optical response of the sample but whose concentrations or values are not in the calibration data base.

DETAILED DESCRIPTION OF THE INVENTION

Figure 1:
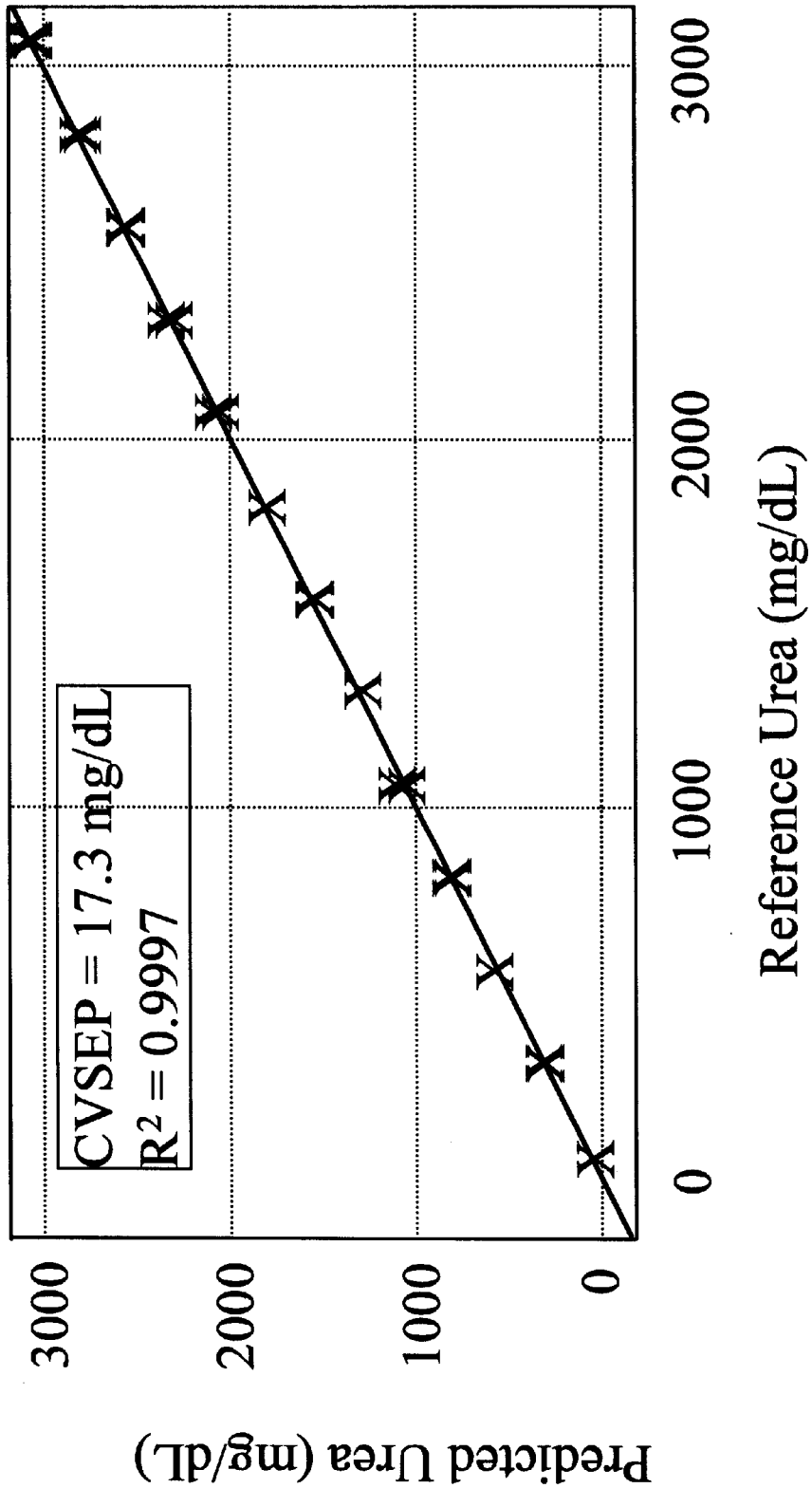
FIG. 1 is a graph of cross-validated PLS predictions for urea based upon the 31 dilute aqueous calibration samples collected at a constant temperature of 23° C. wherein the line of identity is also presented in this and all subsequent prediction plots.

Recent advances in the CLS algorithms have improved the range of problems that can be addressed with the new prediction-augmented classical least-squares (PACLS) methods, see companion application (pending U.S. Ser. No. 09/518,351 filed Mar. 3, 2000) based on provisional application No. 60/123,020. It would be desirable to achieve the best features of CLS or the new PACLS algorithm, and inverse algorithms such as the PLS or PCR algorithms. The combination of CLS or PACLS and PLS or PCR (or any inverse least squares based method) for spectral analysis is the subject of this invention. By combining the explicit/implicit (hard/soft) modeling of CLS and inverse methods (e.g., PLS or PCR), the best features of each method can be realized in a single hybrid method of spectral analysis. Although the discussion concentrates on a PLS application, the new hybrid method can accommodate any appropriate inverse factor analysis method. The invention also includes any multivariate calibration method that uses or contains an inverse method and allows spectral shapes (continuous or discontinuous) to be added directly to the method during calibration or prediction or both, such addition performed without solely weighting by a covariance matrix.

Modification of the PLS algorithm to incorporate the CLS hard model features is facilitated by the fact that the first two steps of the PLS algorithm are actually a CLS calibration followed by a CLS prediction with the restrictive assumption that only a single analyte is present in the calibration samples, see D. M. Haaland and E. V. Thomas, "Partial Least-Squares Methods for Spectral Analyses 1: Relation to Other Multivariate Calibration Methods and the Extraction of Qualitative Information," Analytical Chemistry 60, 1193–1202 (1988). Therefore, these first two CLS steps of the PLS algorithm can be expanded to include all the information about multiple analytes whose concentrations are known in the calibration samples. In this manner, more information about additional components in the calibration samples can be incorporated into the PLS algorithm. Traditionally, the incorporation of this additional information is done with the PLS2 algorithm since PLS2 can use all the concentration information available about the calibration samples, see W. Lindberg, J.-A. Persson, and S. Wold, Anal. Chem. 55, 643 (1983). However, it has been shown that PLS2 reduces the information content of the qualitative pure-component estimates of the analytes by scrambling this information between the various components, see again D. M. Haaland, 1988 above. In addition, the prediction precision of an analyte is generally reduced with the PLS2 method relative to the PLS regression that performs the analysis one component at a time.

The new hybrid CLS/PLS and PACLS/PLS algorithms should both provide better qualitative information while preserving or even improving the analysis precision and flexibility of the PLS method. Throughout this description, CLS/PLS will be assumed to include the PACLS/PLS method. However, it should be remembered that the PACLS spectral shapes need not be added in all applications of this new method. In addition, any inverse calibration method could be coupled with the CLS or PACLS methods. Several approaches to the CLS/PLS hybrid algorithm will be presented in this patent application. Initially, a full cross-validated CLS analysis was performed on all the calibration sample data and the resulting full calibration concentration residuals and spectral residuals were passed to the PLS algorithm for further reduction of concentration and spectral errors. However, in this implementation, even a full cross-validated PLS analysis of the CLS residuals will significantly overfit the residual data. The reason for this overfitting is that PLS can reduce the residual concentration errors to near zero simply by reconstructing the original CLS regression coefficients. Therefore, unless the true optimal number of PLS factors can be obtained independently, this method will yield an overfitted model with inflated prediction errors when true unknown samples are analyzed.

Another approach to implementing the hybrid algorithm involves modification of the first two CLS-like steps in the PLS calibration to include all the concentration information available about the calibration samples. Therefore, the better qualitative information of CLS is achieved in the first PLS weight-loading vector for the analyte of interest (i.e., this first weight-loading vector is the CLS-estimated pure-component spectrum for the analyte with all available concentration information included). This procedure rotates the first PLS weight-loading vector of the analyte in the direction of the pure-component spectrum of the analyte to insure that the first PLS weight-loading vector will have a higher correlation with the analyte concentrations of the calibration samples. Thus, the hybrid algorithm should yield a more parsimonious model with potentially fewer factors since more concentration information is placed in the early loading vectors. The hybrid algorithm can be implemented in the two standard implementations of the PLS algorithm where either the scores or the loading vectors are constructed to be orthogonal. This form of the hybrid CLS/PLS algorithm has the advantage of retaining the qualitative interpretation of CLS while improving the parsimony of the PLS algorithm. However, this implementation does not allow the new PACLS procedure to be fully incorporated into the analysis.

Yet another implementation of the hybrid CLS/PLS algorithm incorporates an initial set of full CLS analysis steps that then passes the CLS concentration residuals and CLS spectral residuals to the PLS algorithm. Unlike the first suggested hybrid algorithm, in this implementation the CLS and PLS portions of the hybrid method are combined in each step of the cross-validation procedure. Thus, the overfitting present in the first suggested hybrid method is alleviated, and the new PACLS features of CLS can be fully incorporated into both the cross-validated calibration and true prediction portions of the hybrid analysis. Therefore, known spectral shapes present in either the calibration or unknown samples that represent spectral components of unknown concentration in the calibration can be included in the hybrid CLS/PLS analysis. In this manner, the CLS/PLS algorithm can efficiently compensate for known spectral shapes present in calibration or prediction samples. Qualitative interpretation, analysis precision improvements, and greater flexibility relative to the standard PLS algorithm are achieved with this implementation of the hybrid algorithm. A further variation of this third implementation of the hybrid algorithm includes a regression step after the CLS steps that relates the CLS-estimated concentrations with the reference concentrations in this initial pass of the CLS algorithm. The additional regression step allows for a slope adjustment to the CLS-estimated concentrations to achieve a better fit to the reference concentrations of the calibration samples.

Our third suggested CLS/PLS hybrid calibration method is presented in Table I. The corresponding hybrid method for prediction is given in Table II. A similar CLS/PCR hybrid method is available where the CLS concentration and spectral residuals are passed to the PCR algorithm during each pass of the cross-validated calibration. In fact, any inverse least-squares method such as multiple linear regression, continuum regression, PLS2, etc. can be coupled with a front-end CLS analysis in a similar manner. With these hybrid algorithms, one obtains the best features of both the hard-model CLS method and the various soft-model inverse least-square methods. Thus, one has 1) greater access to qualitative pure-component information, 2) incorporation of all available component information to achieve a more parsimonious model, and 3) the ability of PACLS to add shapes of known, measured, or estimated spectral components (see the PACLS method described in the companion application (pending U.S. Ser. No. 09/518,351 filed Mar. 3, 2000) based on provisional application No. 60/123,020). The latter capability can serve to adjust the hybrid model for unmodeled components, drifting spectrometers, or changes in spectrometers between calibration and prediction samples. These extra spectral shapes can be added during calibration, during prediction, or separate spectral shapes can be added during both calibration and prediction. Thus, all the features of the PACLS method described in the companion patent application on the PACLS method can be achieved with the CLS/PLS hybrid method. Yet this new hybrid method is less restrictive than PACLS since not all the spectral component concentrations or shapes in the samples need be known with the hybrid method to yield accurate results. In addition, higher precision is usually expected with the inverse factor analysis methods relative to CLS methods, and the same improvement has been demonstrated for the hybrid algorithm. Finally, all the methods previously developed for CLS and PACLS are now available with the CLS/PLS hybrid algorithm. For example, weighted least-squares methods that are so readily accomplished with CLS (see D. M. Haaland, R. G. Easterling, and D. A. Vopicka, "Multivariate Least-Squares Methods Applied to the Quantitative Spectral Analysis of Multicomponent Samples," Applied Spectroscopy 39, 73–84 (1985)) can now be incorporated in the hybrid algorithm to compensate for non-constant spectral noise variance. In addition, the multi-band CLS method described in D. M. Haaland (1985) above, D. M. Haaland and R. G. Easterling, "Improved Sensitivity of Infrared Spectroscopy by the Application of Least Squares Methods," Applied Spectroscopy 34, 539–548 (1980) and D. M. Haaland and R. G. Easterling, "Application of New Least Squares Methods for the Quantitative Infrared Analysis of Multicomponent Samples," Applied Spectroscopy 36, 665–673 (1982) can be used in the new hybrid method to further improve analysis precision. All of the cited references are incorporated by reference herein in their entirety.

TABLE I. CLS/PLS Hybrid Algorithm for Calibration

Step 1. Pretreatment of Data

Center A and C (preferred but optional). However, if all spectrally active chemical components add to 1, then to avoid singularity in step 2, either leave out one component in C, do not mean center the data, or vary pathlengths.

Scale A (optional)

Set index h to 1

Step 2. Estimate the CLS Pure-component Spectra ($\hat{K}$).

Model: $A = CK + E_A$

L. S. Solution: $\hat{K} = (C^T C)^{-1} C^T A \approx C^+ A$ where $C^+$ is the pseudoinverse of C. A variety of methods, including singular value decomposition or QR decomposition (C. L. Lawson and R. J. Hanson, "*Solving Least Squares Problems*," Prentice-Hall, Englewood Cliffs, N.J. (1974)) can be employed to improve the numerical precision of the solution to the pseudoinverse.

Step 3. Estimate the CLS Concentrations

Add spectral baseline components and additional known, estimated or derived spectral features as rows to $\hat{K}$. Add corresponding concentration parameters as columns to the C and $\hat{C}$ matrixes. Call these augmented matrixes $\hat{\hat{K}}$, $\hat{\hat{C}}$, and $\hat{\hat{C}}$, respectively.

Model: $A = \hat{\hat{C}} \hat{\hat{K}} + E_A$

L. S. Solution: $\hat{\hat{C}} = A \hat{\hat{K}}^T (\hat{\hat{K}} \hat{\hat{K}})^{-1} \approx A \hat{\hat{K}}^+$ where $\hat{\hat{K}}$ is the pseudoinverse of $\hat{\hat{K}}$.

Step 4. Calculate CLS Residuals.

Spectral residuals: $E_A = A - \hat{\hat{C}} \hat{\hat{K}}$

Concentration residuals: $E_C = \hat{C} - C$ where $\hat{C}$ is derived from $\hat{\hat{C}}$ by removing the columns of the $\hat{\hat{C}}$ matrix corresponding to the added spectral shapes.

Step 5. Strip All but Single Analyte from $E_c$ to form Concentration Residual $e_c$ for that Analyte.

The following PLS-like steps are to be performed one selected analyte at a time.

Set h=1

Step 6. Estimate Weight-loading Vector ($\hat{w}_h$) for Selected Analyte.
Model: $E_A = e_c w^T + E'_A$ where $E'_A$ is used to differentiate the spectral residuals of the PLS model from the CLS model residuals $E_A$.
L. S. Solution:

$$\hat{w}_h = \frac{E_A^T e_c}{e_c^T e_c}$$

Normalize $\hat{w}_h$

Step 7. Form Score Vector ($\hat{t}_h$) for Selected Analyte.
Model: $E_A = t_h \hat{w}_h^T + E'_A$ L. S. Solution: $\hat{t}_h = \frac{E_A \hat{w}_h}{\hat{w}_h^T \hat{w}_h} = E_A \hat{w}_h$ Step 8. Relate Score Vector ($\hat{t}_h$) to the Concentration Residual.
Model: $e_c = v_h \hat{t}_h + e'_c$ where $e'_c$ represents the new concentration residual for the PLS portion of the hybrid algorithm.

L. S. Solution: $\hat{v}_h = \frac{\hat{t}_h^T e_c}{\hat{t}_h^T \hat{t}_h}$

Step 9. Formation of $\hat{b}_h$, the PLS Loading vector for the CLS Spectral Residuals, $E_A$.
Model: $E_A = \hat{t}_h b_h^T + E'_A$ L. S. Solution: $\hat{b}_h = \frac{E_A^T \hat{t}_h}{\hat{t}_h^T \hat{t}_h}$ Step 10. Calculation of the PLS Spectral and Concentration Residuals
Spectral residuals: $E'_A = E_A - \hat{t}_h \hat{b}_h^T$
Concentration residuals: $e'_c = e_c - \hat{v}_h \hat{t}_h$
Step 11. Increment h, substitute $e'_c$ for $e_c$ and $E'_A$ for EA and Repeat Steps 6 Through 10 for the Desired Number of Loading Vectors.
Step 12. Repeat from Steps 5 to 11 for Other Analytes in the Calibration Samples.

TABLE II. CLS/PLS Hybrid Algorithm for Prediction

Step 1. Center the unknown sample spectrum, a, if A was centered in the calibration. Also scale a if A was scaled.
Step 2. Augment the rows of $\tilde{K}$ further if more spectral shapes are to be added during prediction (e.g., to accommodate system drift with repeat sample spectral differences). Further augment the unknown sample concentration elements of $\tilde{c}$ that correspond to the spectral shapes added to $\tilde{K}$.
Step 3. Estimate the initial CLS-estimated concentrations for the analyte in the unknown sample.
Model: $a = \tilde{K}^T \tilde{c} + e_a$
L. S. Solution: $\tilde{c} = (\tilde{K} \tilde{K}^T)^{-1} \tilde{K} a \approx \tilde{K}^+ a$
Step 4. Calculate CLS spectral residuals using model in Step 3.
$e_a = a - \tilde{K}^T \tilde{K}$
Step 5. Isolate analyte concentration $\hat{c}$ from $\tilde{c}$, add the average analyte concentration $\bar{c}$ from the calibration if the data were mean centered, and label the result $\hat{c}_0$, i.e.,
$\hat{c}_0 = \hat{c} + \bar{c}$ Set h=1.
Step 6. Calculate the PLS score from CLS spectral residual
Solution: $t_h = \hat{w}_h^T e_a$
Step 7. $\hat{c}_h = \hat{c}_{h-1} + \hat{v}_h t_h$
Step 8. $e_h = e_{h-1} - \hat{b}_h t_h$
Step 9. Increment h, substitute $e_h$ for $e_a$ and repeat Steps 6 through 10 until h=r, where r is the number of PLS factors in the hybrid model.
Note: $\hat{w}_h$, $\hat{v}v_h$, and $\hat{b}_h$ are from the PLS portion of the hybrid calibration algorithm, and $e_0 = e_a$.

The hybrid methods disclosed here can be used for any quantitative spectral analysis independent of the type of spectroscopy used. These methods can be used in any spectroscopy where the spectral data are related to the parameters of interest. In addition to quantitation, qualitative and classification analyses can be performed with the hybrid algorithms. Types of spectroscopy where these methods might be used include, but are not restricted to, 1) infrared, 2) near-infrared, 3) visible, 4) ultraviolet, 5) X-ray, 6) gamma-ray, 7) Raman, 8) mass spectroscopy, 9) ion-mobility mass spectroscopy, 10) Auger, 11) fluorescence, 12) phosphorescence, 13) ESCA, 14) far-infrared, 15) microwave, 16) x-ray fluorescence, 17) NMR, 18) energy loss spectroscopy, 19) EDAX, 20) ESR, and 21) multi- and hyper-spectral imaging. These spectroscopic methods can be used in absorption, transmission, reflection, or emission modes. In addition, the hybrid methods can be applied to other forms of multivariate data such as seismic data, chromatographic data, thermal gravimetric analysis, and image data. The hybrid algorithm can also be used for outlier or anomaly detection by examining various outlier metrics such as Mahalanobis distance, spectral residuals, spectral F ratios, or other statistical indications of spectra that lie outside the hybrid model. This additional capability is ideally suited for multi- and hyperspectral image analysis. With the outlier metrics obtained from hybrid algorithm, the hybrid method can also be used for classification purposes. In this discussion, spectral components can include either chemical components (molecular or elemental) or other sources of spectral change that include but are not limited to spectrometer/system drift, chromatic aberrations, diffraction effects, temperature changes, sample insertion and alignment effects, purge changes, alignment changes, detector changes and nonlinearities, source changes, and changes in spectrometer components to include even substitution of whole spectrometers.

The following paragraphs are taken from the companion patent application, pending U.S. Ser. No. 09/518,351 filed Mar. 3, 2000, based on provisional application 60/123,020 and demonstrate the PACLS methods that can be applied to the various different aspects of the new hybrid method presented here.

Normally, in CLS calibration, all significant sources of spectral variation in the spectral region being analyzed should be included in the calibration in order for accurate calibration models to be obtained. This means that all component concentrations of spectrally significant components should be known for the calibration data (except in the case of mixture systems where the sum of spectrally active components is unity, where all but one of the components must be known) This requirement could be relaxed somewhat if the spectra are analyzed separately in multiple spectral windows or regions as described in D. M. Haaland and R. G. Easterling, "Application of New Least Squares Methods for the Quantitative Infrared Analysis of Multi-component Samples," Applied Spectroscopy 36, 665–673

(1982). However, this newly disclosed method allows for known spectral shapes to be substituted for chemical composition information during the CLS analysis. The spectral components not known during calibration can still be included in the CLS prediction model if their shapes are known. Therefore, either the concentrations or the spectral shapes (derived from theory or from empirical measurements) of spectral components can be used in the CLS model. Previously, it was thought that if all spectral component concentrations were not included in the CLS calibration, then CLS would fail to yield accurate results. The CLS analysis result will, in fact, be correct for the components whose concentrations are known during the calibration if all the shapes of components whose concentrations are not known in the calibration samples are added during CLS prediction. The spectral components whose concentrations are not known during calibration, but whose shapes are known cannot generally be reliably predicted if these shapes vary in the calibration spectra. The reason that spectral shapes can be substituted for concentration information is that the net-analyte signal (NAS) (see A. Lorber, Anal. Chem. 58 1167 (1987)) for the concentration components is unaffected by the substitution of shapes used in prediction for concentrations used in CLS calibration. A mathematical proof of this statement is presented in D. M. Haaland and D. K. Melgaard, "New Prediction-Augmented Classical Least Squares (PACLS) Methods: Application to Unmodeled Interferents," submitted to Appl. Spectrosc. (February 2000), the contents of which paper are incorporated herein by reference in its entirety. The NAS is that portion of the analyte signal that is orthogonal to all other sources of spectral variation and is the only portion of the analyte signal that is available for analysis. Note that spectral shapes can include the cases where the spectral intensities are intermittent or even scrambled in frequency or wavelength space. The only requirement is that all calibration spectra, prediction spectra, and added spectral shapes have the same ordering and correspondence of frequencies or wavelengths.

The spectral shapes to be added during cross-validated CLS calibration or during CLS prediction can be determined by a variety of methods. Here, it is assumed that the spectral shapes are a result of the presence of chemical components in the calibration or prediction samples. Later, cases will be discussed where spectral shapes are the result of factors other than molecular or elemental species. If the component shape is unaffected by matrix effects, the spectrum of the pure component can be obtained by simply measuring the spectrum of the pure component. However, quite often, there are matrix effects or interactions between components. In this latter case, the spectral shapes can be obtained by spiking a representative calibration sample with a known (or even unknown) amount of the component. Then spectral differences will yield the spectral shape of the component that also includes displacement of the sample by the component. Another method to determine the spectral shape that is generally preferred is to estimate the component by CLS calibration methods by adding known amounts of the analyte to one or more calibration or known samples. The CLS calibration of this generally small set of samples will yield the desired CLS estimated pure-component spectrum to be included in the PACLS algorithm. If the data are not mean centered, the CLS calibration will yield the pure-component spectrum directly. If the data are mean centered or if an intercept is fit during the CLS calibration, then the pure-component spectrum will represent the pure component with displacement of the sample. Either pure-component spectrum can be used in the analysis since the net-analyte signal for multi-component systems is not affected by the use of the either pure-component spectra or pure-component spectra with displacement.

If spectral shapes are due to spectrometer drift, temperature changes, purge gas changes, sample insertion effects, diffraction effects, or other sources of spectral change that are not due to the chemical components in the system, then the required spectral shapes can be determined through the use of repeat samples. The best single repeat sample is generally the sample representing the center of the calibration space. In the case of a single repeat sample, the sample spectrum of the repeat sample can be obtained during the period of the calibration. This repeat sample can then represent all the environmental changes occurring during the calibration as reflected by the mid-level sample. It is known that the drift of the spectrometer looks different on different samples. Therefore, a sample that represents the calibration data is the preferred sample to use. If the sample is invariant with time, then any change in the sample spectrum will represent spectral shapes that generally have not been explicitly included in the CLS calibration. The addition of these spectral changes to the CLS calibration model will compensate for their detrimental influence on predictions. Often it is best to perform an eigenvector analysis (see C. L. Lawson and R. J. Hanson, "*Solving Least Squares Problems*," Prentice-Hall, Englewood Cliffs, N.J. (1974)) on the repeat sample spectra and to add only those eigenvector shapes that are detrimental to the CLS calibration. In this manner, the detrimental effects of noise on the analysis can be minimized. In addition, it is preferable to perturb the system with all parameters that are known or suspected of influencing the sample spectra. In this manner, the influence of spectrometer/system changes can be systematically included in the PACLS analysis. It is preferred that these perturbations be performed in a statistically designed manner such as a factorial or fractional factorial design. Examples of changes for infrared and near infrared spectrometers that can be included in the perturbation are system temperature, rate of temperature change, sample temperature, sample insertion effects, source changes (intensity, lifetime, bulb changes, etc.), purge gas composition, alignment changes, etc. In addition, if the spectral changes between calibration sample spectra are large; it may be desirable to also take repeat spectra of other samples in the calibration, e.g., samples at the extreme levels of the calibration design. These repeat sample spectra should be mean centered by sample. After mean centering, the spectra can be combined, and if desired, an eigenvector analysis can be performed on all mean-centered spectra in order to select only those eigenvectors that are important for reducing errors in the CLS analysis. This procedure minimizes the effects of spectral noise from the added spectral shapes. For infrared spectra of dilute solutions, a repeat sample representing the absorbing solvent (e.g., water) can be used for the repeat sample if a calibration sample or other representative sample is not available for repeat measurements. Finally, the correction of the model for spectrometer/system drift can be obtained by collecting the repeat sample spectrum during true CLS prediction of unknown samples. The spectral shape of the difference of the repeat sample spectrum obtained during CLS calibration and prediction can be generated from the spectral difference of these repeat sample spectra. Again, if multiple repeat spectra are obtained or if multiple repeat samples are used for monitoring spectral drift of the system, then mean-centered differences and eigenvector analysis can be employed to generate the shapes added during CLS predictions. Repeat spectra taken as close as possible in time to the unknown sample spectrum should provide the best correction for drift of the system.

If it is desired to transfer a CLS calibration between the primary spectrometer (i.e., the spectrometer upon which the calibration was based) and a secondary spectrometer, then the spectral shapes to add to the CLS analysis can be obtained from the spectra of one or more samples obtained on both spectrometers. The mean difference between the sample spectra obtained on the two spectrometers will represent the CLS bias concentration error on the secondary spectrometer. The mean-centered spectral differences will model other spectrometer effects that decrease the precision of the analysis on the secondary spectrometer when using a CLS calibration obtained on the primary spectrometer. These spectral differences can also be used to represent and to help model spectrometer drift on the two spectrometers. Again an eigenvector analysis with selection of eigenvectors can improve the quality of the prediction on the secondary instrument by minimizing spectral noise and other spectral variations that may not be important for CLS predictions.

An additional method to obtain shapes for inclusion in the new PACLS method is to collect spectra from a variety of samples that vary all spectral components not analyzed while all components to be analyzed with CLS are kept invariant at either zero or constant levels. Of course the best approach is to use experimental designs in the generation of these samples or to select the sample spectra based upon spectral extremes and obtaining a good spectral distribution. Again, eigenvector analysis and selection of eigenvectors will improve the final CLS analysis by selecting only important shapes for reducing prediction errors. If samples with components present at zero or constant concentration are not available, then an alternative method to generate the appropriate spectral shapes is to first obtain the spectral shapes of each analyte to be determined in the CLS analysis (using methods as described above) or by any other independent means including measuring the spectrum of the pure analyte directly or by using a library spectrum of the analyte. Then if the analyte spectral shapes are subtracted from the calibration spectra in their known reference concentrations, the resulting spectra represent the best linear estimate of the sample spectra at zero analyte concentration. The resulting difference spectra will represent linear combinations of the interfering spectral species and other effects such as nonlinearities, matrix effects, and mispecified pure-component spectrum of the analyte. Adding these resulting difference spectral shapes directly or adding selected eigenvectors from the eigenvector decomposition of these difference spectra to the hybrid calibration or prediction will result in improved predictions.

Another application of the method occurs when the starting materials used in the CLS calibration differ from those used during preparation or generation of the prediction samples. This is a common occurrence in industry when natural products or variable starting material purity is encountered. In this case, the CLS calibration can be adapted to the changes in the starting materials by simply obtaining the starting material spectra for the calibration materials and the comparable materials used in the later CLS prediction analysis whenever the starting materials have changed. The difference spectra again represent those spectral differences that were not included in the original calibration. The inclusion of these shapes in the prediction phase of the CLS analysis should compensate for these unmodeled spectral differences if the analyte concentrations do not change. If the analyte concentrations change, then these analyte concentration changes must be determined and included in the analysis.

The spectral shapes to add to the PACLS algorithm can be generated artificially. In addition to the artificial generation of baseline variations (e.g., linear, quadratic, higher order polynomials, exponential, etc.), spectral shapes due to the nonlinear effects of stray light in absorbance spectra or specular reflection in reflection-absorbance spectra can be generated and added to the PACLS analysis. In these two latter cases, various portions of the single-beam spectrum of the background can be added to the single-beam sample spectrum. These single-beam-augmented spectra are then converted to absorbance (or -log(R) for reflectance spectra). The original absorbance or reflectance spectrum is then subtracted from the series of augmented spectra. These difference spectra represent the spectral shapes of the nonlinear effects of stray light or specular reflectance. Again eigenvector analysis of these shapes should improve the signal-to-noise of the added shapes.

Artificial methods can also be used to simulate the effects of non-linear detector response. For example, in Fourier transform infrared (FT-IR) spectroscopy, nonlinear detector response results in single-beam spectra that are displaced lower in intensity relative to a linear detector. Therefore, subtracting a constant amount of intensity from all single-beam sample spectral intensities can simulate spectrometer nonlinearities. These shifted single-beam spectra are converted to absorbance. The original absorbance spectrum is then subtracted from the simulated absorbance spectrum to represent the shape of the nonlinear spectrometer response. Generating a series of spectra in this manner can simulate linear representations of the nonlinearities. Again eigenvector analysis of these shapes should improve the signal-to-noise of the added shapes.

It is important that the linear component of the shape of the analyte of interest not be present in the spectral shapes that are added in the CLS analysis. If the spectral shapes of the analyte are present in the spectral shapes added during CLS prediction, then the resulting CLS analysis can be significantly degraded due to the loss of net-analyte signal.

It is possible that nonlinearities in the calibration samples can be included in the CLS analysis as demonstrated in D. M. Haaland, "Methods to Include Beer's Law Nonlinearities in Quantitative Spectral Analysis," in ASTM Special Technical Publication, *Computerized Quantitative Infrared Analysis*, G. L. McClure, Editor, STP 934, 78–94 (1987), which describes methods for accounting for nonlinearities in the CLS analysis. Shapes of nonlinear portions of the component spectra can be determined by assuming nonlinear functional forms for the concentration matrix during calibration. Any explicit functional form of the concentrations may be used. As an example, squared component concentrations can be added to the concentration matrix for all those components thought to experience nonlinear behavior. Concentration cross products can be added for interacting components. The CLS-estimated pure-component spectra for the squared and/or cross-product components can be included during prediction to minimize the influence of nonlinearities in the analysis. Either linear or nonlinear least squares CLS solutions to the problem can be used with the inclusion of these additional terms. Also, as described in the above reference, spectral residual shapes from the CLS analysis can be added to reduce the effects of deviations from the linear additive model (e.g., Beer's law model).

Martens and Naes have proposed an approach to accommodate the effects of an inadequately specified CLS calibration (see H. Martens and T. Naes, "Multivariate Calibration by Data Compression," in Near-infrared Technology in Agricultural and Food Industries, Ed. P, C. Williams and K. Norris, Am. Assoc. Cereal Chem. St. Paul Minn., 57–87 (1987) and Martens and Naes, Multivariate Calibration, John Wiley & Sons, New York, 191–202 (1989)). They describe using spectral shapes generated from an eigenvector decomposition of the spectral residuals from an inadequately specified CLS calibration model in a method that they label the extended Beer's law model. The eigenvectors of the spectral residuals for the CLS calibration contain all the sources of variation other than those due to the components explicitly included in the CLS calibration estimation of the pure-component spectra. Therefore, these eigenvectors represent useful spectral shapes that can then be added in the PACLS prediction phase of the hybrid calibration or prediction. This method of determining and adding spectral shapes has the advantage that additional experiments do not have to be performed to obtain the spectral shapes for augmentation. The hybrid method is also ideally suited for general quantitative multi- and hyperspectral image analysis. It is desired that the pure spectra be generated from the spectral analysis of the spectral images using any one of a variety of methods of determining pure-component spectra from the spectral images (e.g., pixel purity index, see J. W. Boardman, F. A. Kruse, and R. O. Green, "Mapping target signatures via partial unmixing of AVIRIS data: in Summaries," Fifth JPL Airborne Earth Science Workshop, JPL Publication 95-1, v. 1, p. 23–26, 1995, SIMPLISMA, see W. Windig, "Spectral data files for self-mideling curve resolution with examples using the SIMPLISMA approach," Chemom. and Intell. Lab. Syst. 36, 3–16, 1997, or various methods of multivariate curve resolution (MCR), see R. Tauler, A. Smilde, and B. Kowalski, "Selectivity, Local Rank, Three-Way Data Analysis and Ambiguity in Multivariate Curve Resolution," J. Chemom. 9, 31–58, 1995). However, if sources of future spectral variation are either not present or are present at a constant level in the images, then the pure component spectral estimates from the image will not be adequately defined for future CLS-type predictions. Independent measures of the potential interfering spectra (or linear combinations of them) can be added in a hybrid analysis of the spectral image data. Sources of spectral variation that may not be adequately included in the pure-component spectral estimates include but are not limited to, purge or atmospheric variations, spectrometer drift, view angle changes, chromatic aberration, or any spectral component that is not in the calibration image(s) but may be present in the prediction image. Thus, any multi- and hyperspectral imaging is an important potential beneficiary of the hybrid algorithm. In fact, the use of multi- and hyperspectral imaging can have a very beneficial impact on the scanning of microarrays for studying the expression of genes. In the current microarray scanning technology, univariate measurements of fluorescence are used in a scanning mode to identify and quantify the fluorescence tags of hybridized gene fragments on the microarray slides. Performing multi- or hyperspectral imaging of the fluorescence signals on the microarray can increase sensitivity, speed, accuracy, reliability, and the numbers of fluorescence tags that can be simultaneously monitored on the microarray slide. The hybrid algorithm is ideally suited to perform this analysis and can be used to minimize or even eliminate the detrimental influences of stray light and contaminant and substrate fluorescence on the quantitative analyses.

In correcting for chromatic aberrations, linear estimates of the pure-component spectra of the aberrations can be determined from the difference between the spectra from a homogeneous region and the spectra at the edges of the homogeneous region. If the functional form of the aberration is known, then these functions can be used to obtain pure-component spectra of the aberrations that are better than the linear approximations described above.

If the component spectral shape was not present in the calibration spectra but is present in the unknown sample spectrum to be predicted, then the PACLS-estimated component concentration of the added shape should be a good estimate of the added component. If this spectral shape is present and variable in the calibration spectra, then its PACLS estimated component concentration might not be reliable.

All methods previously developed for CLS should also work for PACLS. Examples of added features for CLS are weighted least squares, generalized least-squares, base-line fitting, pathlength correction, multi-band analysis (i.e., spectra are separated into multiple spectral regions with CLS analysis applied separately to each spectral region and the results pooled into a final result, see D. M. Haaland and R. G. Easterling, "Application of New Least Squares Methods for the Quantitative Infrared Analysis of Multicomponent Samples," Applied Spectroscopy 36, 665–673 (1982)). It should be noted that any spectral preprocessing should be applied to the original calibration spectra, the prediction spectra, and the spectral shapes added in the PACLS method. Preprocessing steps include but are not limited to baseline correction, pathlength scaling, smoothing, derivatives, normalization, variance or auto scaling, and Fourier transforms. When pathlength scaling is performed, pathlength adjustments are normally applied by dividing the spectra by the pathlength to compensate for the intensity variations expected for pathlength changes in the individual samples. However, this procedure scales all components of the spectra equally. Not all sources of spectral variation should have this pathlength correction applied to them. Examples of spectral variation than should not be scaled include, but are not limited to, drift of the spectrometer, spectrally active purge gas components, and spectral changes external to the sample. In order to properly handle these different spectral components, the effect of pathlength scaling can be removed from the appropriate components by scaling the non-pathlength component concentrations in the CLS calibration by the inverse of the pathlength. This procedure effectively removes the effect of inappropriate scaling of the non-pathlength spectral components.

A method to select the eigenvectors to include in the PACLS prediction from any of the analyses discussed above is based upon the use of the CLS calibration model to perform a CLS prediction on the eigenvector spectral shapes. Since the eigenvectors are orthogonal basis vectors, the errors from the eigenvectors are independent. Thus, the total error variance of all the spectral shapes included in the eigenvector decomposition is the sum of the error variances of the individual errors from each eigenvector. Therefore, the eigenvectors can be selected from those that represent the largest error sources in the standard CLS calibration (or PACLS calibration if spectral shapes are included during the building of the calibration model and additional shapes are to be included during true prediction or validation). Since the NAS is also decreased by the addition of interfering spectral shapes, the influence of this decrease in NAS can also be incorporated into the selection of eigenvector shapes to include in the PACLS analysis. In this case, the eigenvectors to include in the PACLS analysis can be selected based upon the inverse of the ratio of the squared change in net-analyte signal (NAS) and squared prediction error. It should be noted that CLS and PACLS can be modified to follow any functional form for relating spectra to parameters of interest. Therefore, series of spectra that represent kinetic runs where the kinetics equations are known can use CLS and PACLS methods to extract kinetic rate constants as well as component concentration information. Other effects such as the influence of pH or scattering on the data can be included in the CLS hard modeling if functional forms of the relationship between the spectra and the varying parameter are known.

Outlier detection has always been an important feature of multivariate spectral analysis methods, and the hybrid algorithm shares this feature. Thus, outlier metrics such as spectral F ratio, concentration F ratio, Mahalanobis distances, and examination of concentration and spectral residuals are all possible outlier detection methods using the various new forms of the hybrid algorithm. Outlier detection significantly improves the reliability of the analysis with the hybrid algorithm.

Wentzell and coworkers have developed an alternative inverse least squares method where spectral shapes representing estimates of the covariance matrix are incorporated into a PCR analysis through the use of a weighting by the estimated covariance matrix (see P. D. Wentzell, D. T. Andrews, and B. R. Kowalski, Anal. Chem. 69, 2299 (1997) and P. D. Wentzell, D. T. Andrews, D. C. Hamilton, K. Faber, and B. R. Kowalski, J. Chemometrics 11, 339 (1997). They call their method maximum likelihood PCR. Our method is different from our generalized from of the hybrid algorithm in that the spectral shapes we add are added directly to the algorithm rather than through a weighting matrix formed from the covariance matrix generated from spectral shapes. The purpose of their algorithm is to eliminate correlated measurement errors. Our method is more general, has more applications, and directly adds the spectral shapes to a portion of the hybrid algorithm to assure that the multivariate model ignores the influence of the added spectral shapes in the estimation of the constituent analytes or the parameters of interest.

Turning back to the new hybrid method presented herein, several points bear emphasis. The examples below will concentrate upon a version of the new hybrid method that combines PACLS and PLS. Another variation combines PACLS and PCR. The invention can also be extended to any generic inverse least squares method of spectrographic analysis. These other methods would include, but are not limited to, inverse least squares, multiple linear regression, PLS, PLS2, PCR, continuum regression, etc. Although use of PACLS is often preferred over only using CLS, there will be situations where CLS alone works better. However, PACLS adds significant flexibility to the hybrid method by allowing the addition of spectral shapes to the original calibration model, the prediction phase of the analysis, or separately to both.

Demonstration of the Hybrid Method with Several Applications

This description of various applications follows many of the same examples given in companion application based on provisional application No. 60/123,020 since the new hybrid method described in this document incorporates the PACLS methods disclosed therein and extends them to the inverse multivariate calibration methods. Therefore, the new hybrid algorithm can be used in many of the same variety of spectroscopic applications as PACLS. For example, CLS/PLS can be used to compensate for the presence of known but unquantified spectral components in the calibration data (i.e., the shape of the spectral component is known or can be determined, but its concentration in the calibration samples is unknown).

PACLS/PLS can also be used to compensate for unmodeled spectral components that are present in the prediction samples but were not present in the calibration samples. An example of PACLS/PLS accommodating unmodeled components can be found in spectral data collected from a series of calibration samples consisting of multicomponent mixtures of dilute aqueous samples. The experimental details for the system can be found in D. M. Haaland and H. D. T. Jones, "Multivariate Calibration Applied to Near-Infrared Spectroscopy for the Quantitative Analysis of Dilute Aqueous Solutions," 9th International Conference on Fourier Transform Spectroscopy, J. E. Bertie and H. Wisser, Editors, Proc. SPIE Vol. 2089, pp. 448–449 (1993). Basically, the 31 calibration samples were prepared in a Latin-Hypercube experimental design with urea, creatinine, and NaCl varying in the range from 0 to ~3000 mg/dL in water. The concentrations were corrected for displacement of the water solvent. The near infrared spectra (7500–11000 $cm^{-1}$) of the samples in 10-mm pathlength cuvettes were obtained with a Nicolet 800 Fourier transform infrared (FT-IR) spectrometer. The samples were temperature equilibrated with stirring to 23° C. with the use of a Hewlett-Packard Peltier temperature controller that includes the capability of using magnetic stirring. After preparation, the sample solutions were sealed along with a small Teflon-coated magnetic stirring bar in the cuvettes using a glass cover slip and optical cement. The sample spectra were obtained in random run order operating the spectrometer at a nominal 16 $cm^{-1}$ resolution and signal averaging 256 interferograms. The spectrometer source was a 75 W tungsten-halogen lamp, the beamsplitter was made of quartz, and the detector was a liquid-nitrogen-cooled InSb detector. Several days later, the near-infrared spectra of the same set of samples were obtained with each sample temperature controlled to randomly selected 1° C. intervals from 20 to 25° C. In addition, 11 spectra of pure water were obtained in 10-mm cuvettes that were randomly equilibrated in 0.5° C. intervals from 20 to 25° C.

A standard cross-validated PLS calibration was performed on the 31 calibration samples obtained at 23° C. A cross-validation procedure was performed excluding one sample at a time. The PLS cross-validated predictions for urea are presented in FIG. 1. In this figure, CVSEP is the cross-validated standard error of prediction and $R^2$ is the cross-validated squared correlation coefficient for the cross-validated calibration.

Figure 2:
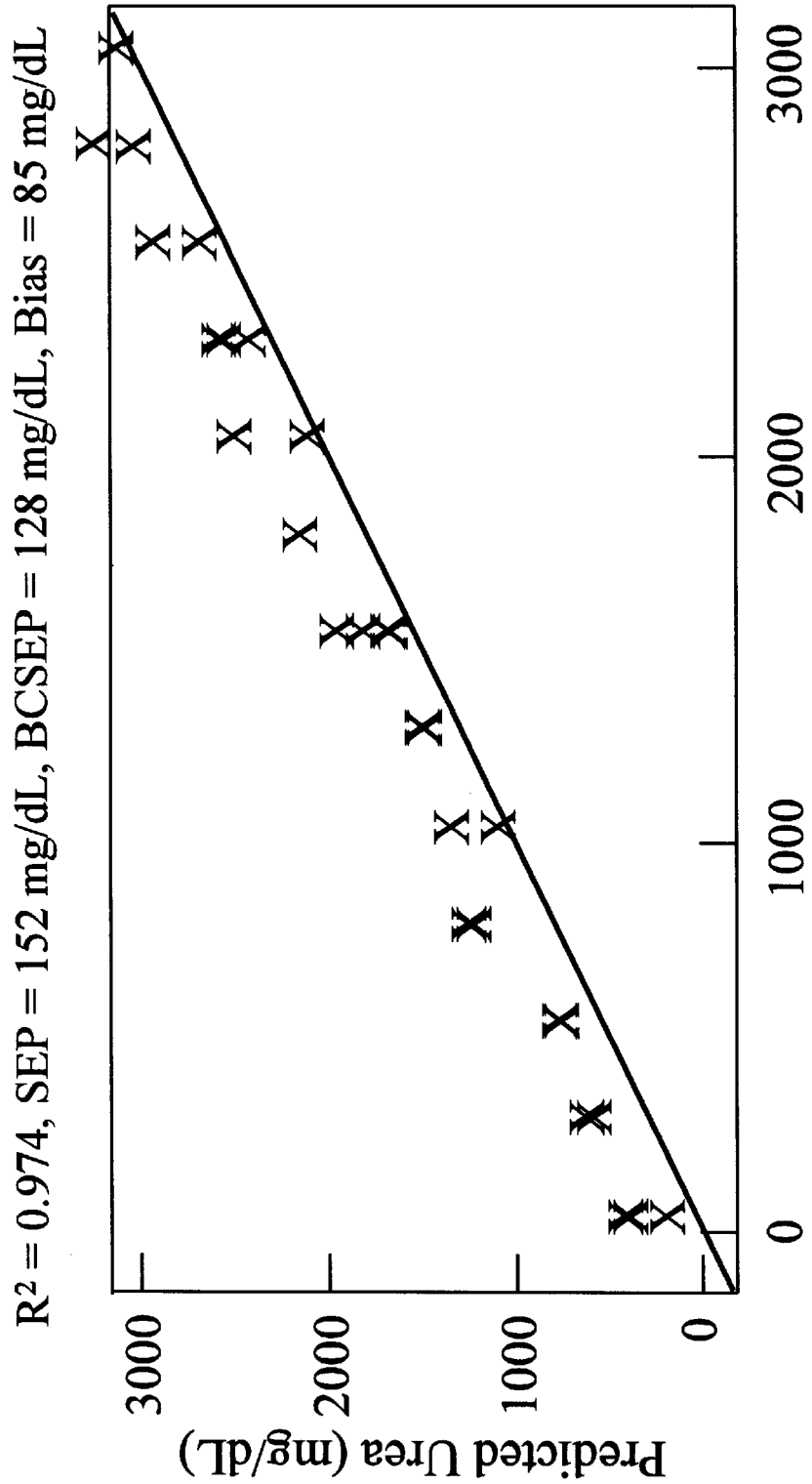
FIG. 2 is a graph of urea PLS predictions obtained when applying the constant-temperature PLS model to variable-temperature solution spectra.

This constant-temperature PLS model was then used to obtain predictions for the urea component in the variable temperature spectra collected several days after the calibration data. The results of these PLS predictions are presented in FIG. 2 where SEP is the standard error of prediction, BCSEP is the bias-corrected SEP, and $R^2$ is the squared correlation coefficient for the prediction of urea.

Figure 3:
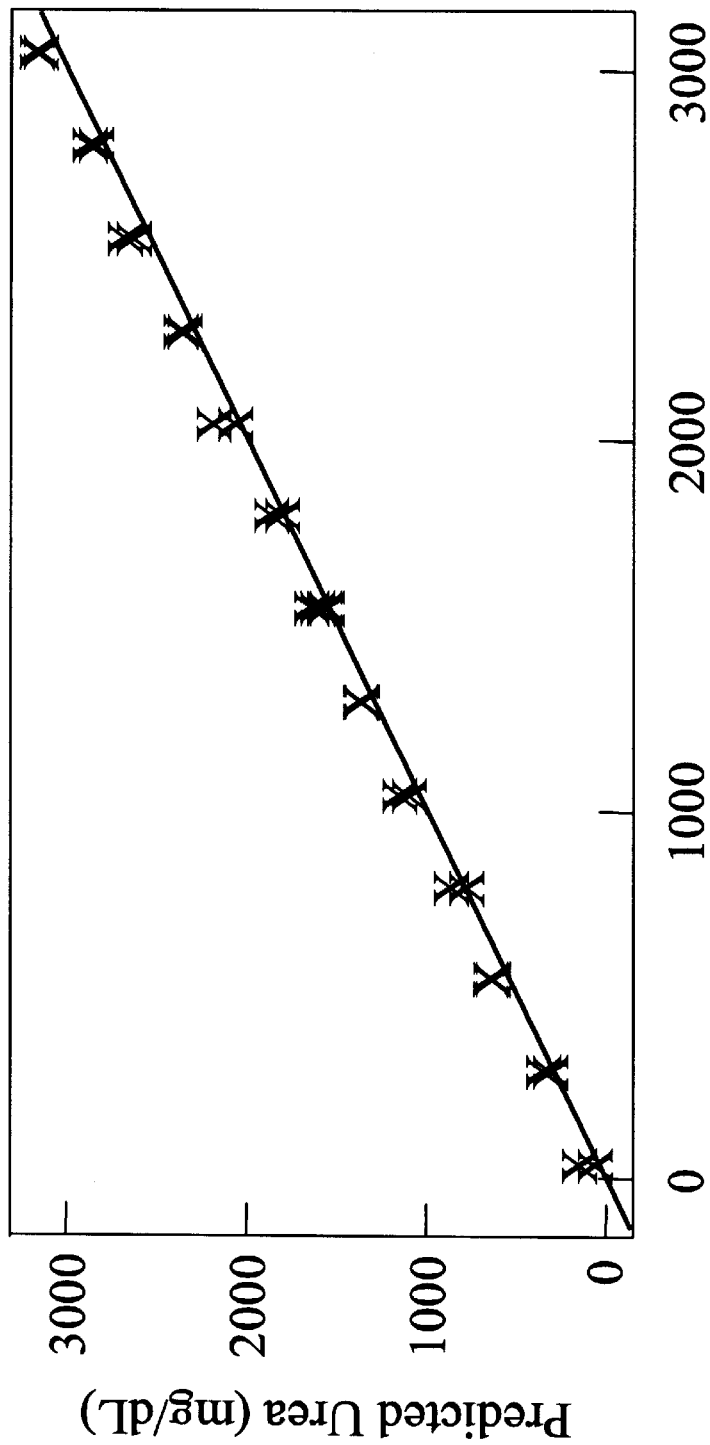
FIG. 3 is a graph of urea predictions of variable-temperature solution spectra obtained by applying the constant-temperature PACLS/PLS model with the addition of the temperature pure-component spectral shape of water with only urea reference concentration information added during calibration.

The urea concentration predictions are degraded both by the presence of the unmodeled temperature component and the effects of unmodeled spectrometer drift that occurred during the collection of the variable temperature samples and between each set of experiments. If the shape of the pure-component of temperature obtained during CLS calibration of the 11 variable temperature water spectra is added to the PACLS/PLS calibration, the prediction of urea in the variable temperature data improves considerably. As demonstrated in FIG. 3, these results are even better than was achieved with the PACLS algorithm applied to the same data (see SD-6227). In addition, only urea concentrations and the temperature pure-component spectral shape of water were given to the hybrid algorithm. Therefore, there is a clear relaxation in the information that the hybrid algorithm requires for good prediction results. However, the detrimental effects of instrument drift are still present in the predictions. The instrument drift causes a bias error as well as a slight decrease in precision of the prediction results.

Figure 4:
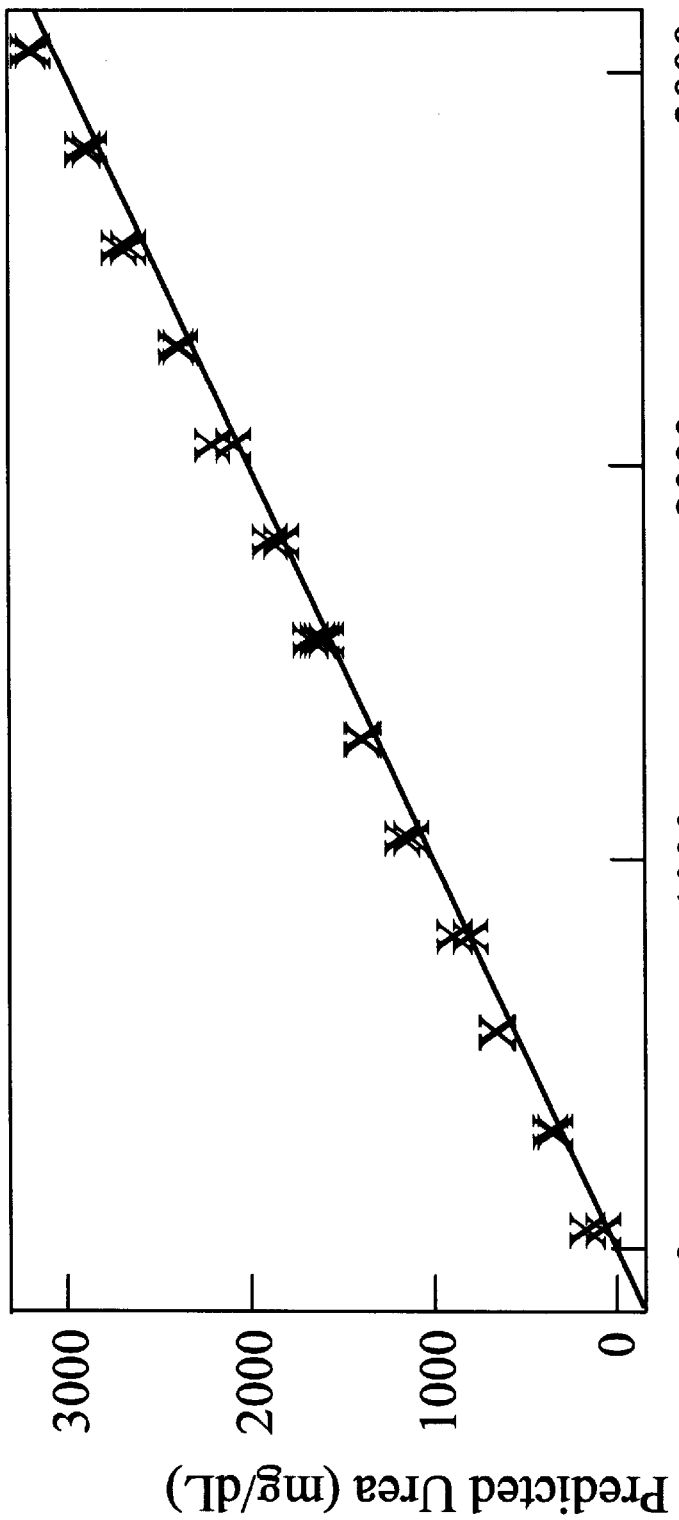
FIG. 4 is a graph of urea predictions of variable-temperature solution spectra obtained by applying the constant-temperature PACLS/PLS model with the addition of the temperature pure-component spectral shape of water wherein all analyte reference concentration information plus run order were added during calibration.

If the hybrid algorithm is given all the concentration information of all the components plus the temperature pure-component spectral shape, a slight further improvement is achieved (see FIG. 4). Thus, the desired feature of the hybrid model to improve predictions when additional concentration information is present has been realized and the results are an improvement over the PLS2 method previously used to incorporate the additional available concentration information into the calibration.

A further improvement in analysis precision can be realized if the detrimental effects of spectrometer drift during the collection of the unknown samples can be included in the PACLS/PLS analysis. An improvement in prediction ability can be realized by the use of a subset of sample spectra obtained on the spectrometer during both the constant and variable temperature experiments. A subset of 5 samples representing the center-point and extreme samples in the concentration calibration space were removed from the variable temperature data set along with repeat measurement spectra of some of these same samples. The spectra were then used in a CLS calibration to estimate the 6 pure-component spectra of the analytes (i.e., urea, creatinine, and NaCl), plus the solvent, temperature, and linear spectrometer drift. In addition to the concentrations of chemical species, run order was included in the CLS calibration to approximate the linear effects of instrument drift. Since the spectra were obtained at approximately constant time intervals, run order represents time of sample collection. Also, the drift of the system was relatively monotonic with time, so this procedure compensates for some of the detrimental effects of system drift on the CLS calibration. All these pure-component spectra include at least a portion of the effects of spectrometer drift between the constant and variable temperature experiments.

Figure 5:
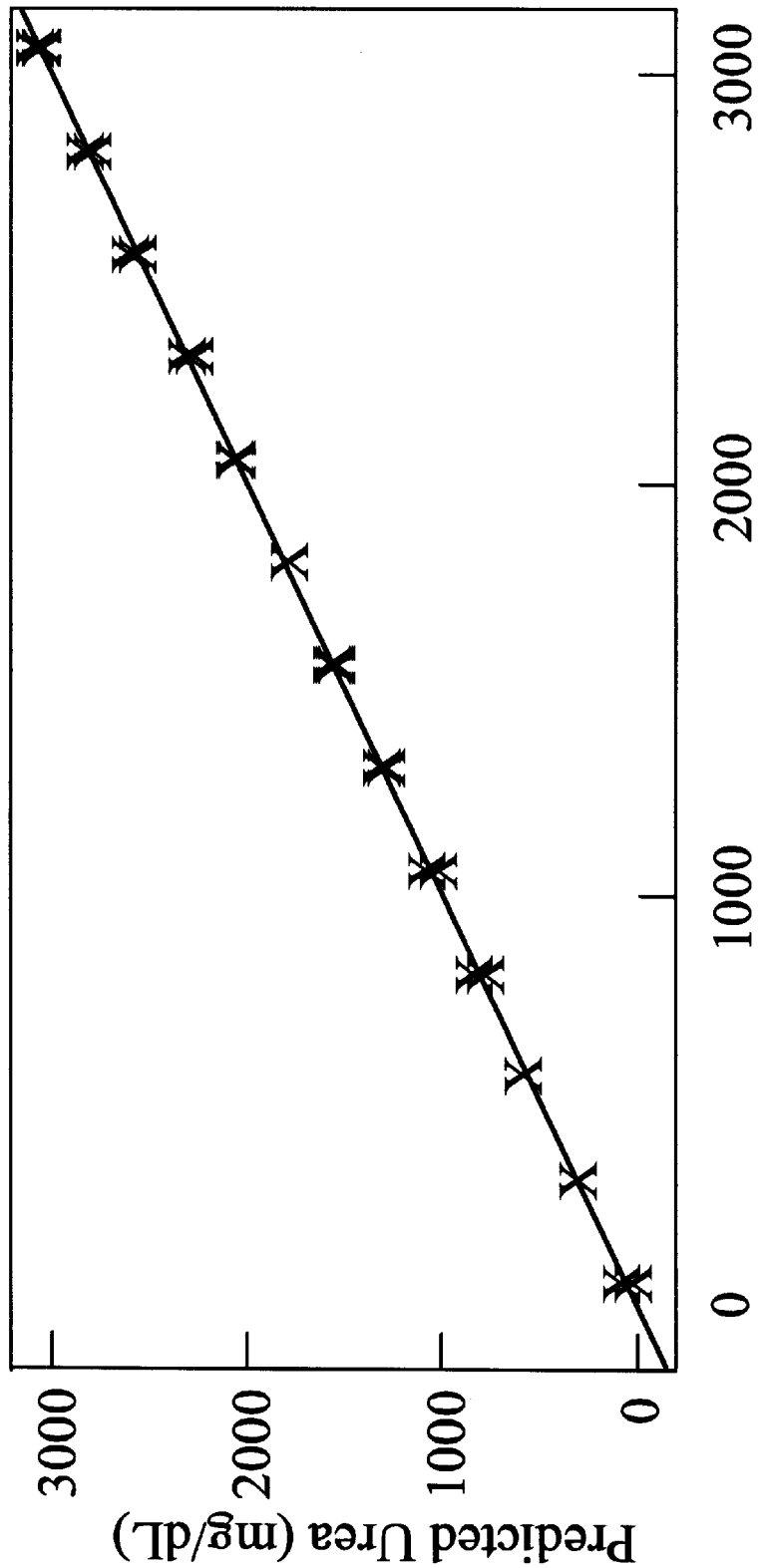
FIG. 5 is a graph of urea predictions of variable-temperature solution spectra obtained when applying the constant-temperature PACLS/PLS model with the addition of the 5 non-urea CLS-estimated pure-component spectral shapes obtained from the variable-temperature subset samples.

The 5 CLS-estimated pure-component spectra (excluding the urea pure-component spectrum) obtained from the subset of variable temperature samples were added to the PACLS/PLS calibration of the constant temperature data. In this case, urea concentrations from the calibration samples represented the only concentration information presented to the model. During the PACLS/PLS prediction steps in the cross validation procedure, an offset, linear slope, and quadratic curvature (i.e., a quadratic baseline) were simultaneously fit along with the urea weight-loading vector and the CLS-estimated pure-component spectral shapes of the three molecular components, temperature, and system drift. This hybrid model was then used to predict the spectra from the variable temperature data. These PACLS/PLS prediction results for urea improve dramatically as shown in FIG. 5. In FIG. 5, the prediction on the subset of samples used for the CLS estimated pure-component spectra from the variable temperature experiment were excluded from the prediction results to eliminate the potential for overfitting of the prediction data. Similar improvements in prediction ability were achieved for all the molecular species in the samples using similar PACLS/PLS prediction procedures. In fact, in this case where temperature variation was not present in the original calibration data, the PACLS/PLS prediction of temperature for the temperature varying samples can also be achieved. In addition, the temperature and other pure-component spectral shapes could be added only in the prediction phase of the PACLS/PLS analysis rather than during the building of the original hybrid calibration model. No recalibration of the original constant temperature data is required, and the analysis can be performed simply and rapidly in the prediction phase of the analysis.

The use of PACLS/PLS to model spectrometer drift and to maintain a calibration on a drifting spectrometer can be demonstrated with infrared spectral data that are presented in L. Han, T. M. Niemczyk, and D. M. Haaland, "Enhancing IR Detection Limits for Trace Polar Organics in Aqueous Solutions with Surface-Modified Sol-gel-coated ATR Sensors." Applied Spectroscopy 53, 381–389 (1999) and D. M. Haaland, L. Han, and T. M. Niemczyk, "Use of CLS to Understand PLS IR Calibration for Trace Detection of Organic Molecules in Water," Applied Spectroscopy 53, 390–395 (1999). In these experiments, the infrared spectra of dilute aqueous solutions of isopropanol and acetone were obtained. The sensors for the experiments were modified sol-gel-coated attenuated total reflectance (ATR) sensors that improve prediction ability for the polar organic molecules by concentrating the organic molecules in the partially hydrophobic film while excluding the interfering water solvent from the film. Since the effective penetration depth of the evanescent wave is less than the thickness of the film, this new class of sensors has been demonstrated to improve infrared detection limits for organic molecules in aqueous solutions by orders of magnitude.

Figure 6:
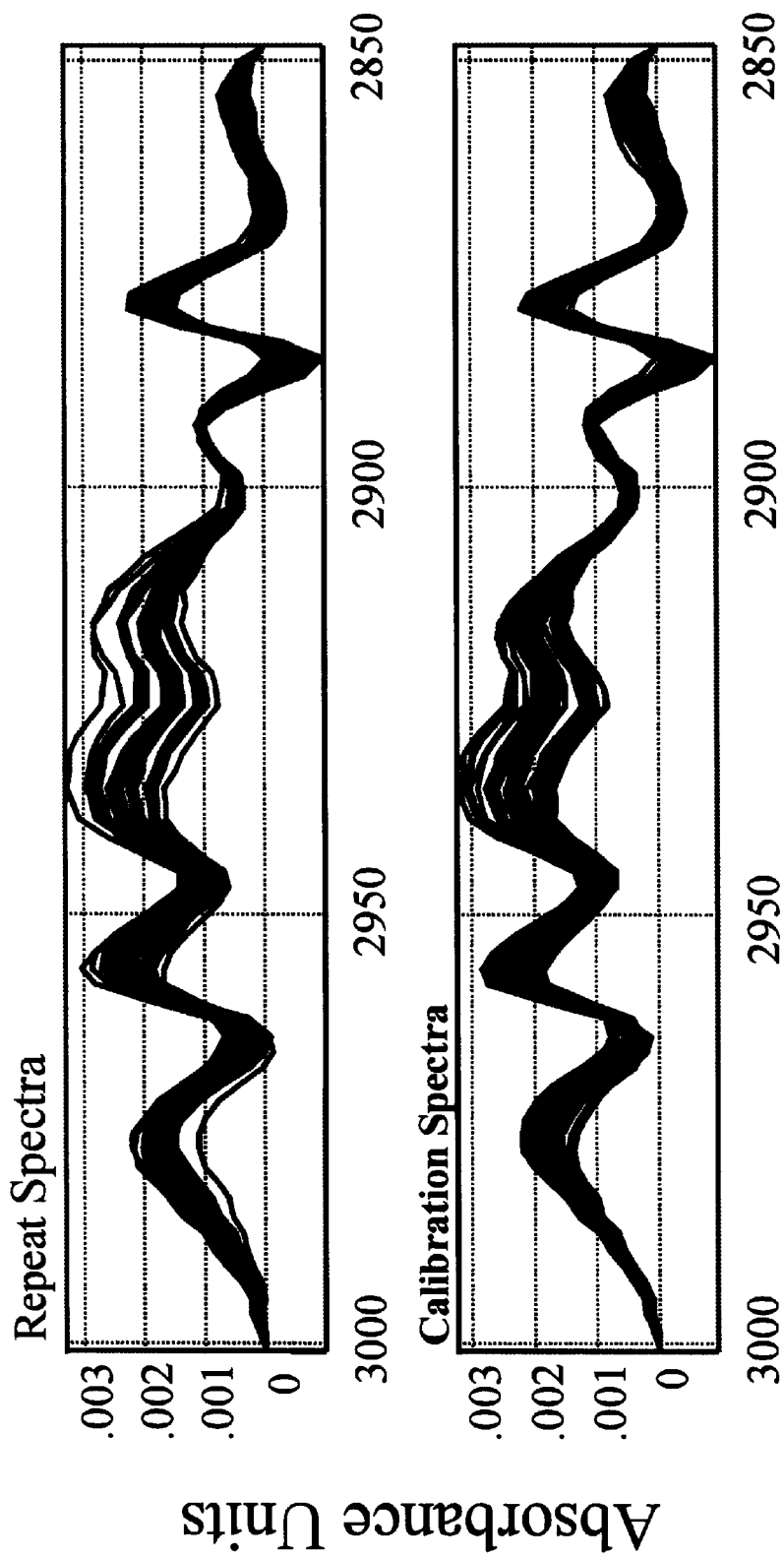
FIG. 6 is a graph of linear-baseline-corrected spectra of the repeat sample spectra (upper plot) and the calibration sample spectra (lower plot).

In experiments designed to test the infrared detection limits for acetone and isopropanol with the use of these new ATR sensors, it was observed that spectral variations due to spectrometer and sensor drift dominated the spectral variance of the variable composition samples. A set of calibration samples was generated based upon a 5-level, 2-factor factorial experimental design. The two factors were acetone and isopropanol concentrations that were varied at five levels from 0 to 20 parts per million (ppm) and 0 to 100 ppm for acetone and isopropanol, respectively. Repeat preparations of the center-point and 4 extreme points of the calibration concentration space were also included in the analysis. One preparation of the center-point composition was measured after every six samples by reinserting the sample into the sensor. In addition, on three occasions, ten repeat spectra of the center-point sample were obtained without removing the sample. Only the quantitative analysis of isopropanol will be reported here since it was the isopropanol C-H stretching spectral region that experienced dominant spectral effects from spectrometer/sensor drift. The linear-baseline-corrected IR spectra of the calibration samples and all spectra from the center-point repeat sample are shown in FIG. 6. Clearly the effects of system drift are dominant in these data since the total variation of the spectra appears to be comparable for both the calibration and repeat sample spectra.

If the PACLS/PLS model is allowed to incorporate spectrometer/sensor drift effects occurring after collection of the calibration data and during the collection of the unknown sample spectra, we might expect that the model could maintain a calibration in the presence of significant instrument drift. The spectral shapes of spectrometer/sensor drift can be represented with the use of the center-point repeat sample spectra collected throughout this study. If the repeat sample is truly invariant over time, then the variations in the spectra must represent the spectral variations of spectrometer/sensor drift or spectral effects of insertion variation of the sensor into the spectrometer and the reintroduction of the sample onto the sensor. All the repeat spectra are mean-centered (i.e., the average of the repeat spectra was subtracted from each repeat sample spectrum) to generate the spectral shapes representing spectrometer/sensor drift and sample insertion variation.

Figure 7:
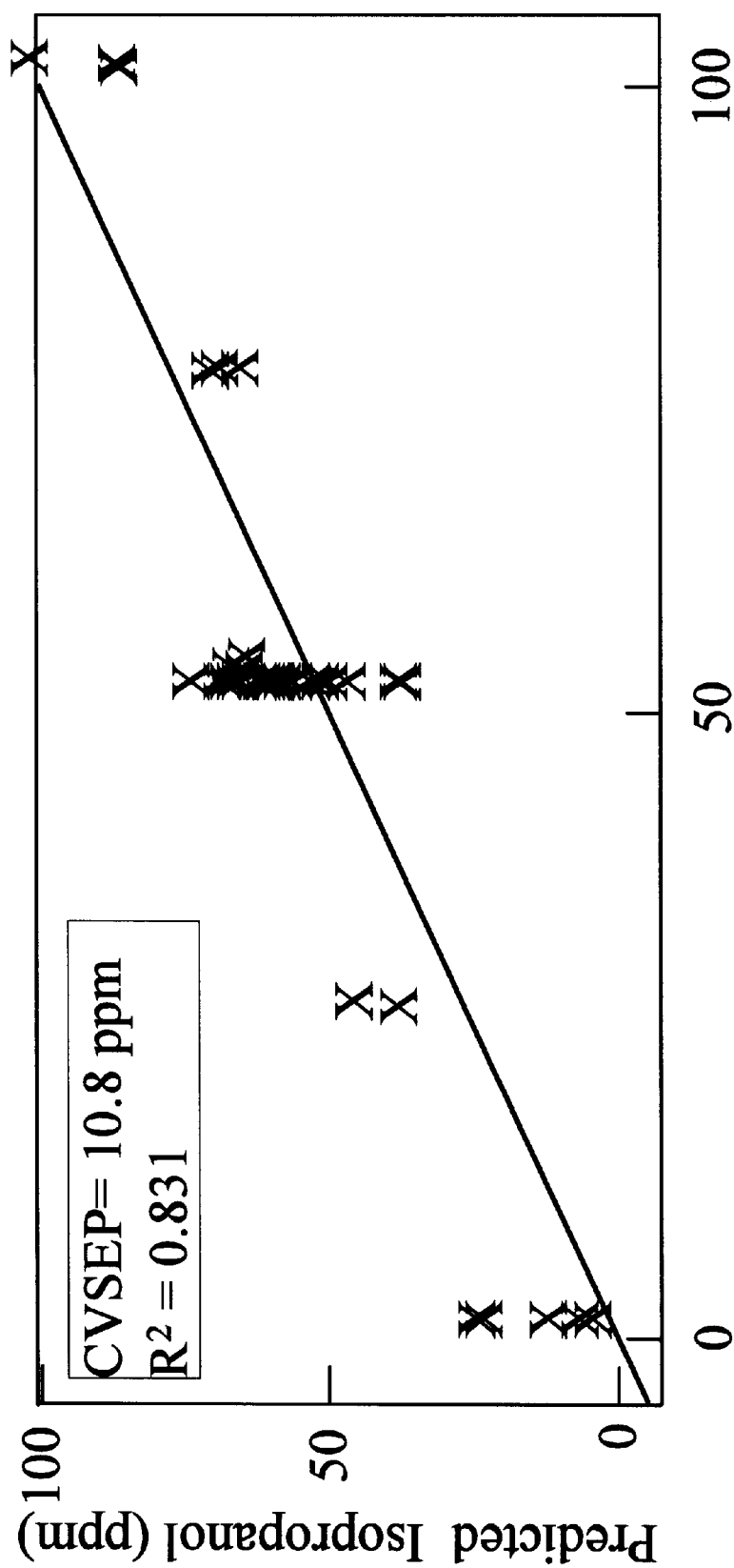
FIG. 7 is a graph of cross-validated PLS predictions of isopropanol using all the calibration sample spectra collected in the morning.
Figure 8:
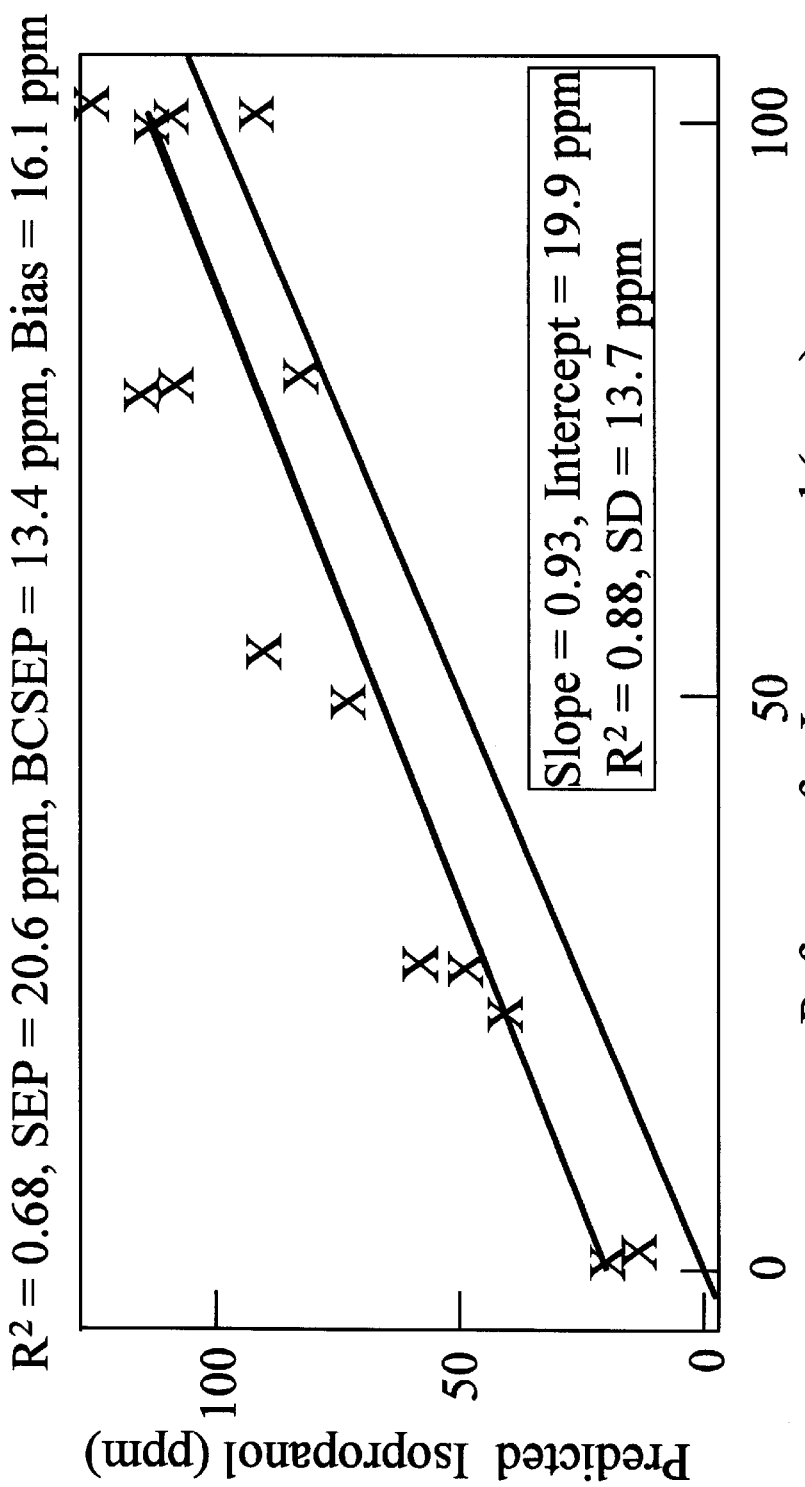
FIG. 8 is a graph of isopropanol prediction of the afternoon calibration sample spectra based upon a PLS model generated on the morning calibration and morning repeat sample spectra wherein the line above the line of identity is the linear-least squares fit of the predictions.

To demonstrate the maintenance of calibration, the data set was separated into morning and afternoon sets of sample spectra. These two data sets can then be used to test the abilities of PACLS/PLS to maintain a calibration in the presence of a strongly drifting spectrometer/sensor system. Because system drift is the dominant source of spectral variance, this data set represents a challenging test for maintaining a calibration with the PACLS/PLS method. In order to compare the new PACLS/PLS method with the existing PLS method, a PLS model for isopropanol was built based upon all the morning calibration and morning repeat data. The cross-validated PLS calibration results for isopropanol are shown in FIG. 7. The PLS model was then used to predict all the non-repeat sample spectra from the afternoon. The resulting PLS predictions are shown in FIG. 8. The PLS prediction exhibits both a bias and some loss of precision relative to the PLS calibration on the cross-validated PLS analysis of the morning data. The expected line of identity and the linear-least-squares fit of the prediction data are included in FIG. 8. Also presented in the plot are the SEP, bias-corrected SEP (BCSEP), and the bias for the predictions. In addition, the slope, intercept, squared correlation coefficient ($R^2$), and standard deviation (SD) of the predictions about the linear-least-squares fit of the prediction data are presented in the FIG. 8.

For PACLS/PLS, all the spectral shapes (42 shapes) from the mean-centered repeat samples could be added during cross-validated PACLS/PLS calibration or prediction. However, an improvement in the hybrid model prediction ability is expected if an eigenvector analysis of the mean-centered repeat spectra is performed and only the highest signal-to-noise spectral shapes are added to the PACLS/PLS analysis. In this manner, the detrimental effect of spectral noise in the repeat spectra is minimized in the PACLS/PLS model.

Initially, the first 8 eigenvectors were selected for inclusion in the PACLS/PLS analysis based upon a visual examination of the eigenvectors. Only the first 8 eigenvectors appeared to represent information where the spectral information exceeded the noise. Selection of eigenvectors can be made more systematic by using the CLS/PLS model (without repeat sample spectral shapes added) applied to the eigenvector spectra obtained from the repeat samples. Only those eigenvectors that contribute significantly to the prediction error variance can be selected and added to the PACLS/PLS analysis. Alternatively, the eigenvectors to include in the PACLS/PLS analysis can be selected based upon the inverse of the ratio of the squared change in net-analyte signal (NAS) and squared prediction error.

Figure 9:
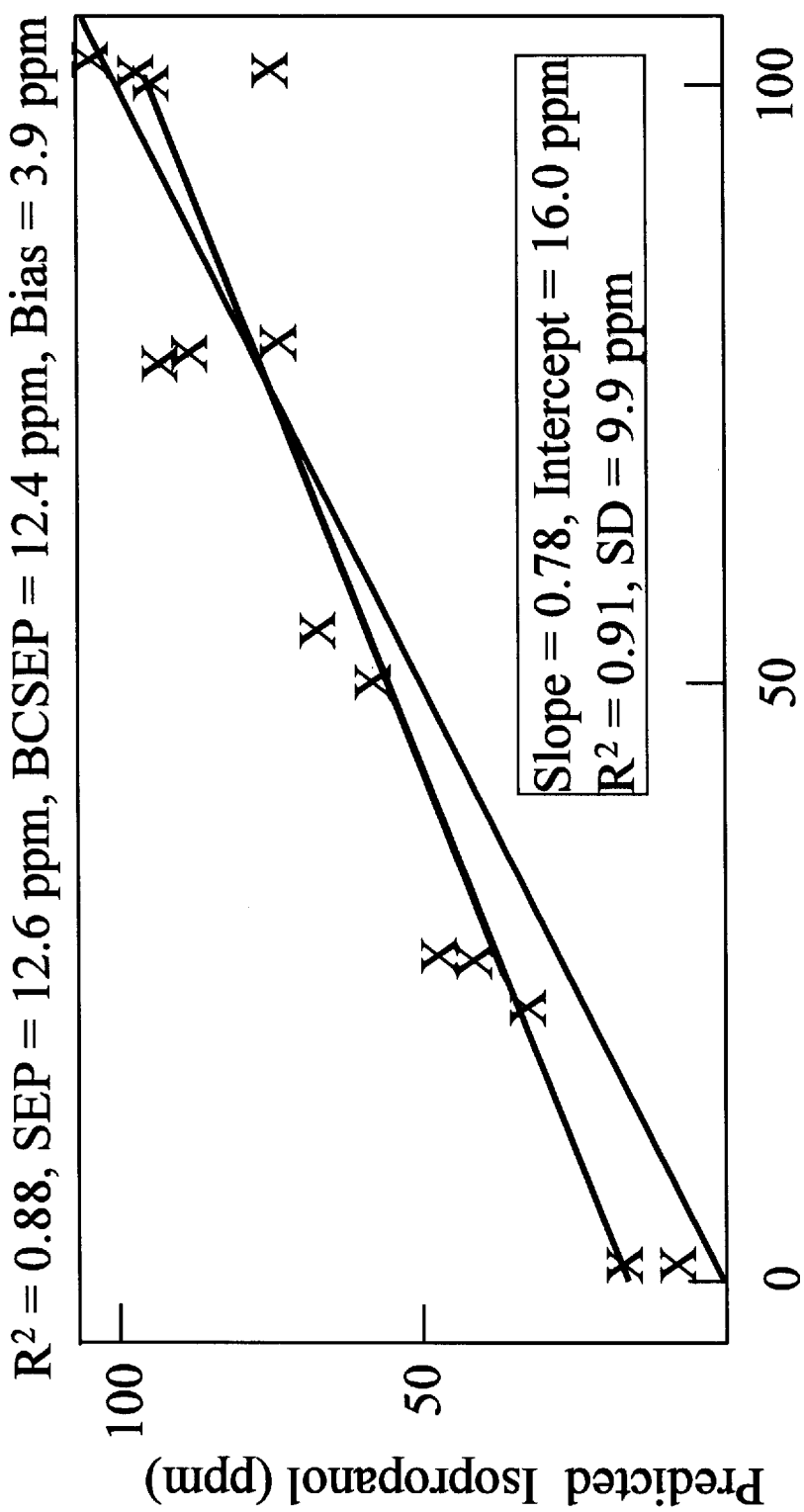
FIG. 9 is a graph of isopropanol prediction of the afternoon calibration sample spectra based upon a PLS model generated from the morning calibration sample spectra and morning and afternoon repeat sample spectra wherein the line above the line of identity on the left is the linear-least squares fit of the predictions.
Figure 10:
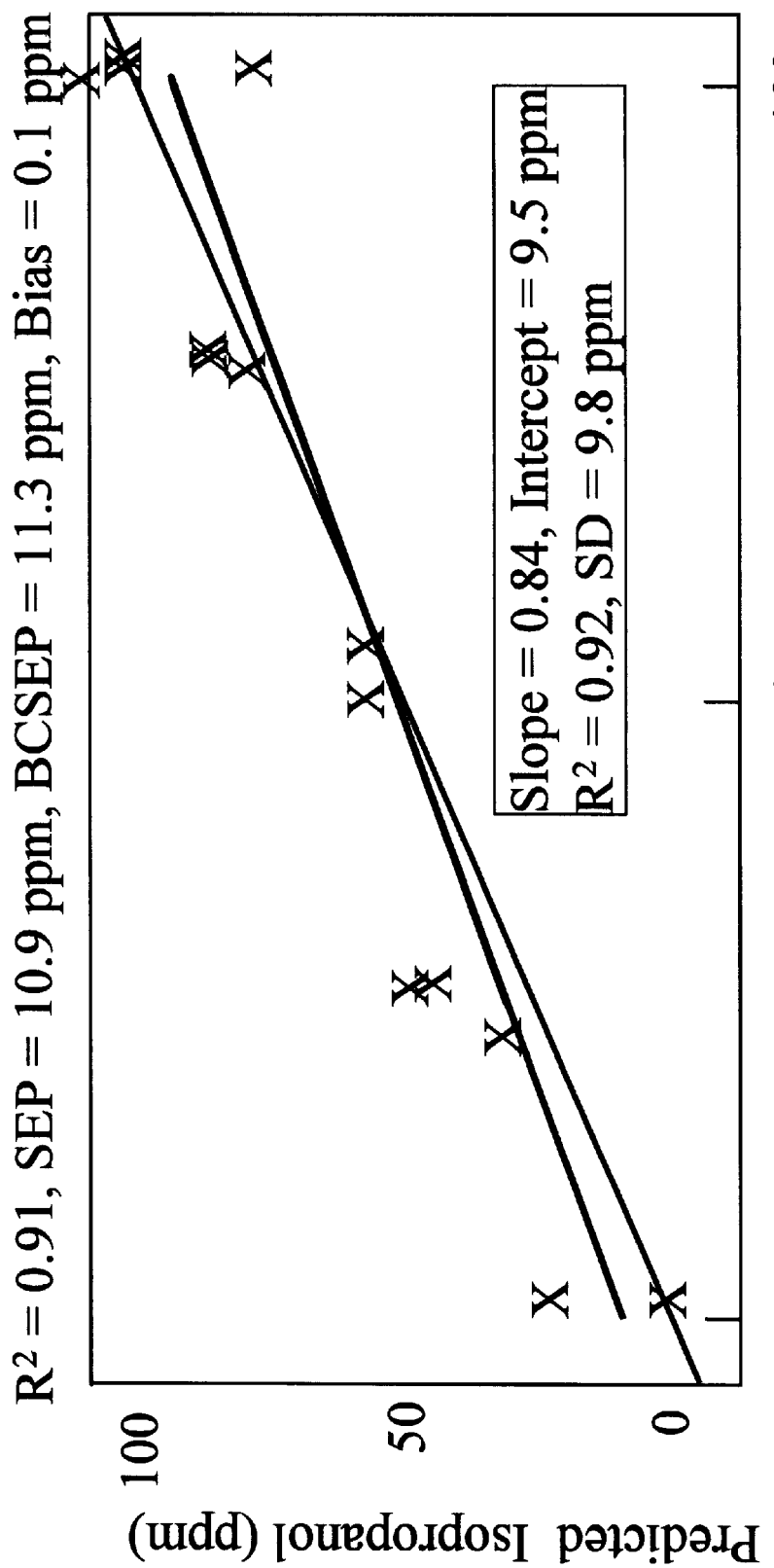
FIG. 10 is a graph of isopropanol prediction of the afternoon calibration sample spectra based upon a PACLS/PLS model generated on the morning calibration sample spectra and the first 8 eigenvectors obtained from the morning and afternoon repeat sample spectra wherein the line above the line of identity on the left is the linear-least squares fit of the predictions.

Since PACLS was given spectral information from the afternoon repeat spectra, this same information was given to the PLS model to achieve a fair comparison of the two methods. Therefore, PLS and PACLS/PLS calibrations were built using all the morning calibration samples and the repeat spectral information from both the morning and the afternoon parts of the experiment. The PLS calibration included all 43 repeat sample spectra while the PACLS/PLS calibration model used only the first 8 eigenvectors developed from the 43 morning and afternoon repeat spectra. The predictions of the afternoon non-repeat spectra are shown in FIGS. 9 and 10 for PLS and PACLS/PLS, respectively. PACLS/PLS yields lower prediction errors than the PLS model (i.e., SEP of 10.9 and 12.6 ppm for PACLS/PLS and PLS, respectively). PACLS/PLS outperformed PLS, and the PACLS/PLS prediction results for this drifting system are virtually identical to that obtained during the original calibration.

Alternatively, if predictions that are near real time are required, then the hybrid method can be performed in a different manner than presented above. We have taken the same morning and afternoon data set presented above and performed analyses using either the nearest repeat before or the nearest repeats before and after the prediction spectra were obtained to update the hybrid model. In this case, the spectral shapes added in the hybrid analysis were the first 8 eigenvectors from the morning repeats and the difference between the average morning repeat spectrum and the selected afternoon repeat spectrum or spectra. When the surrounding afternoon repeat spectra were used in the hybrid prediction, then the SEP of the afternoon spectra was found to improve relative to performing PLS predictions that were given the same spectral information in the form of added repeat spectra in a recalibrated PLS calibration.

Figure 11:
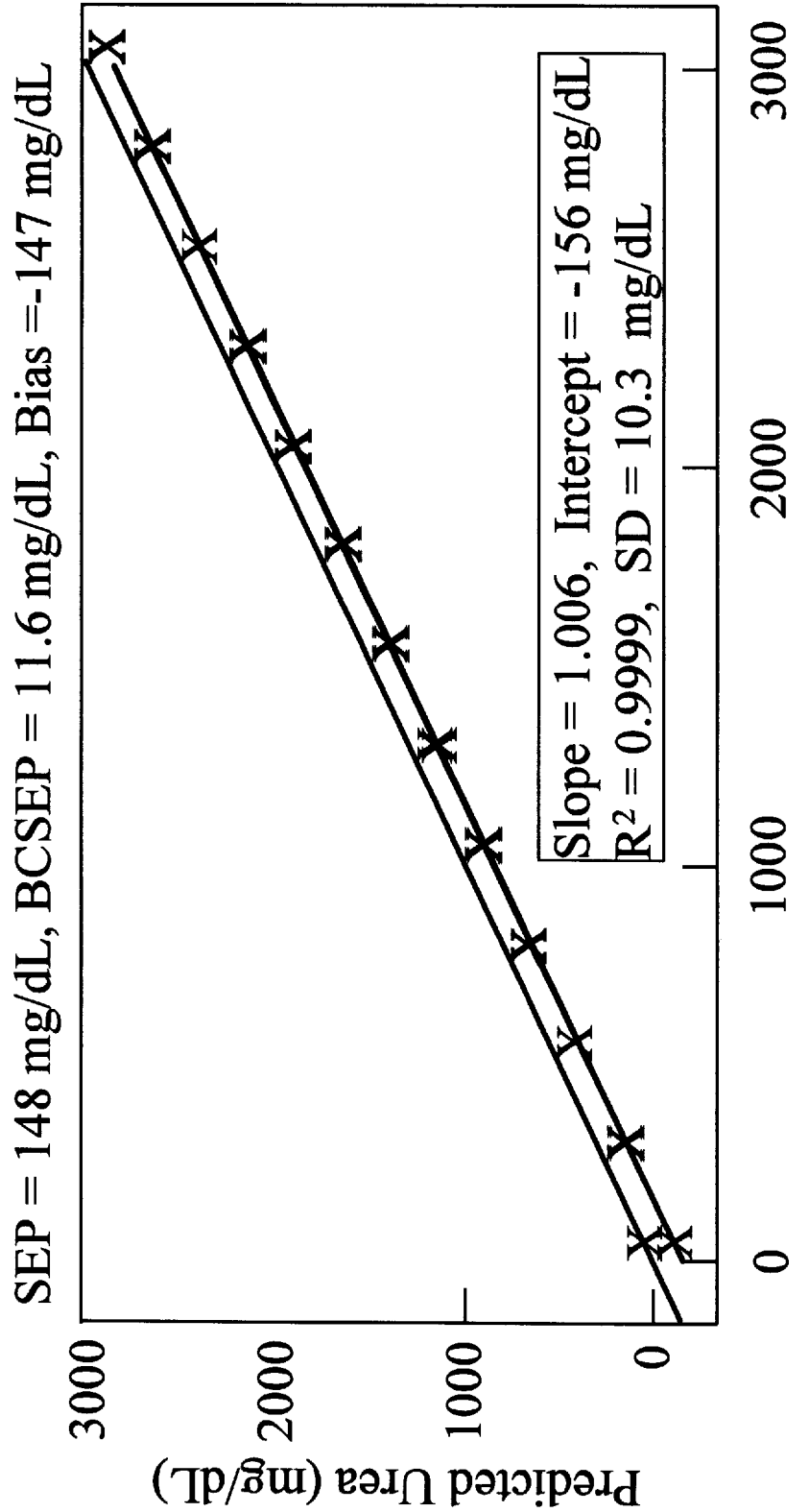
FIG. 11 is a graph of urea predictions for sample spectra obtained on a secondary spectrometer based upon a urea PLS calibration model using sample spectra obtained on the primary spectrometer wherein the line below the line of identity is the linear-least squares fit of the predictions.

The final demonstration of the PACLS/PLS method is its use for calibration transfer between two spectrometers. In this case, the near infrared spectra of the 31 samples of dilute aqueous solutions of urea, creatinine, and NaCl described in the first example in this discussion were obtained on both primary and secondary spectrometers. The standard PLS calibration model was built using the spectra obtained on the primary spectrometer at a constant temperature of 23° C. The cross-validated PLS predictions are shown in FIG. 1 for these calibration data. The standard PLS model was then applied directly to spectra obtained on a second Nicolet 800 spectrometer using the same samples again equilibrated to 23° C. The PLS prediction results for urea are presented in FIG. 11. Clearly there is a large bias and loss of precision on the secondary spectrometer primarily due to differences in the spectra obtained on the two spectrometers. However, instrument drift also contributes to these errors.

Figure 12:
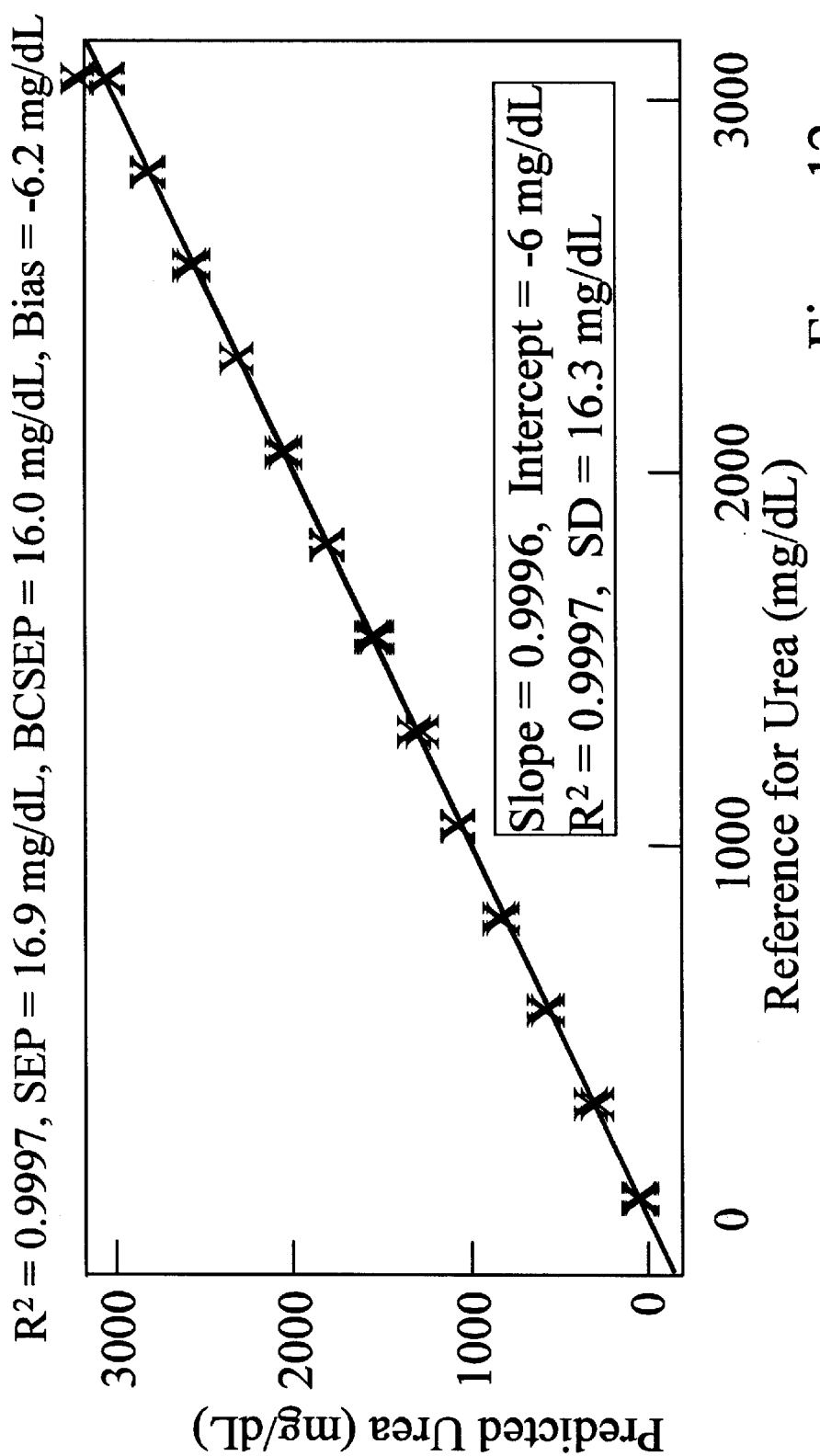
FIG. 12 is a graph of urea predictions for sample spectra obtained on a secondary spectrometer based upon a PACLS/PLS calibration model using sample spectra obtained on the primary spectrometer plus spectral difference shapes from 5 subset samples run on both primary and secondary spectrometers wherein the line of identity and the linear-least squares fit of the predictions are indistinguishable on this plot.

A subset of the same 5 samples selected in the first example of this description was measured on both the primary and secondary spectrometers. The difference absorbance spectra from corresponding pairs of samples measured on the two spectrometers were then calculated. These difference spectra can be used in the PACLS/PLS algorithm to correct for both spectrometer differences and to some extent correct for spectrometer drift within and between the two sets of spectral data. Results were obtained with all 5 spectral difference shapes added to the PACLS/PLS analysis. FIG. 12 demonstrates the improvement in true prediction for urea using the PACLS/PLS algorithm. These PACLS/PLS predictions on the secondary spectrometer sample spectra are indistinguishable from the cross-validated PLS calibrations results obtained on the primary spectrometer. Similar improvements are found for the creatinine and NaCl analytes.

Figure 13:
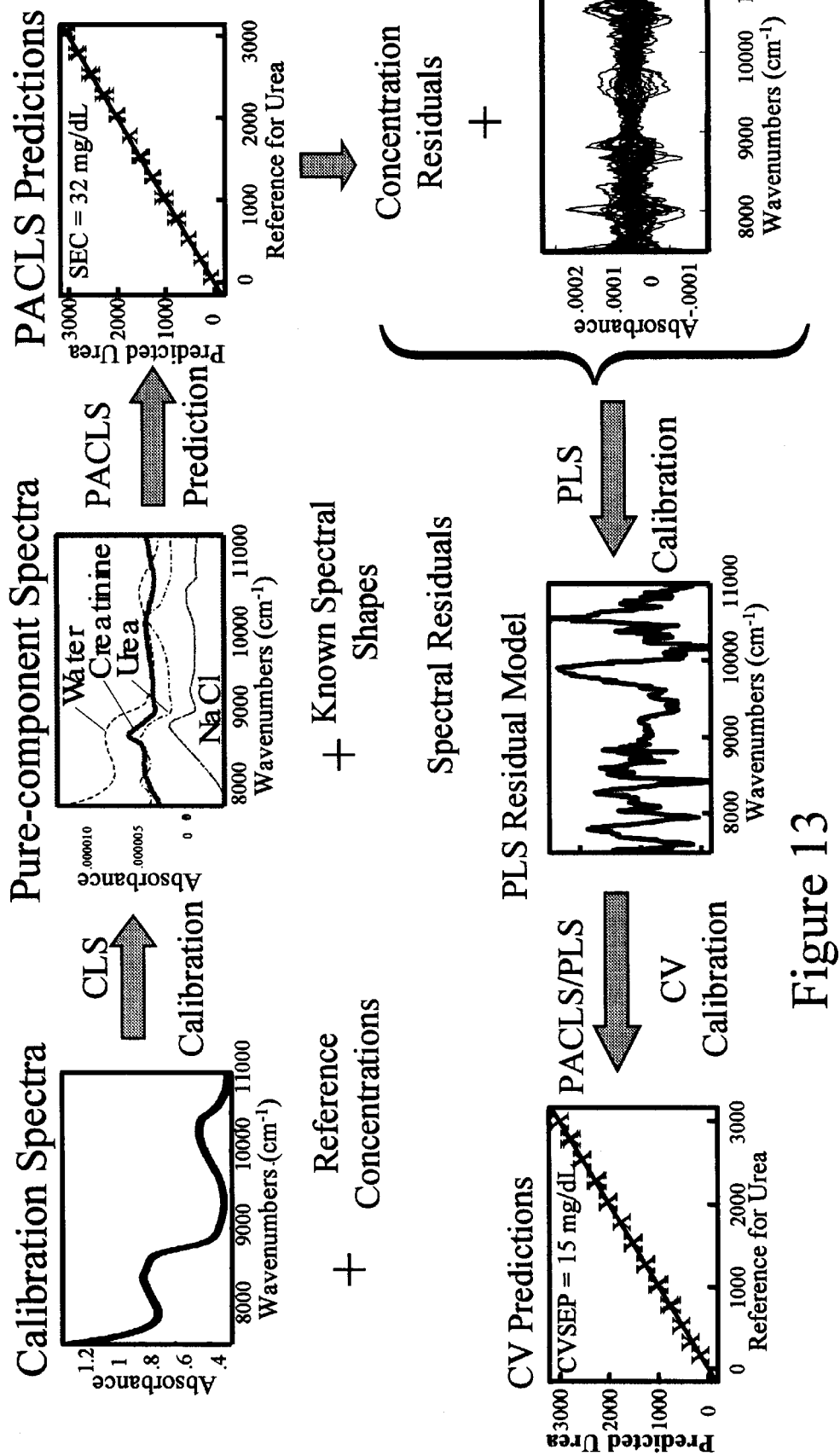
FIG. 13 outlines the various steps of the hybrid calibration method using the example of urea analysis in constant-temperature aqueous solutions where the known spectral shape of a temperature change is added during the hybrid calibration.

FIG. 13 outlines the various steps of the hybrid calibration method using the example of urea analysis in constant-temperature aqueous solutions where the known spectral shape of a temperature change is added during the hybrid calibration.

Figure 14:
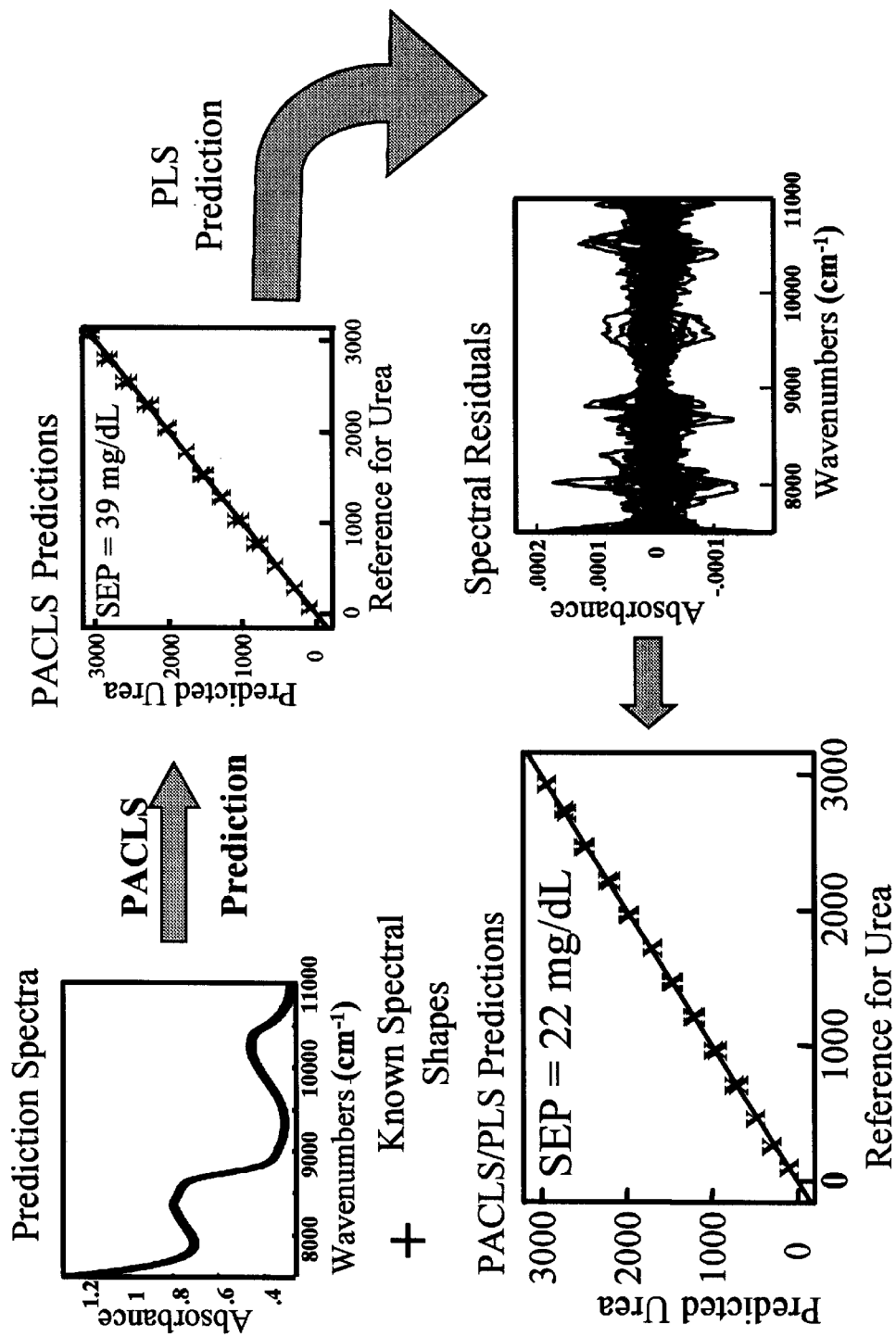
FIG. 14 outlines the various steps of the hybrid prediction method using the example of predicting urea concentrations in variable temperature aqueous solutions where the spectral shapes added during prediction represent spectral shapes of spectrometer drift obtained from a subset of samples measured during both calibration and prediction experiments.

FIG. 14 outlines the various steps of the hybrid prediction method using the example of predicting urea concentrations in variable temperature aqueous solutions where the spectral shapes added during prediction represent spectral shapes of spectrometer drift obtained from a subset of samples measured during both calibration and prediction experiments.

CONCLUSIONS

Several hybrid algorithm approaches have been described above. Multiple uses, implementations, and applications of the hybrid algorithms have been presented for quantitative and qualitative spectral analysis. The new combined algorithm is a definite improvement over the prior classical least squares and partial least squares antecedents, and this hybrid algorithm has been shown to enhance these existing multivariate calibration methods. The examples above have demonstrated the power of this new hybrid algorithm method to incorporate unmodeled components or other spectral information into the multivariate models, to maintain a calibration on a drifting spectrometer, and to transfer these multivariate spectral models between spectrometers. In short, this new hybrid method is a clear improvement over its antecedents, the classical least squares method, the prediction-augmented classical least squares method, and the inverse least squares methods.

In reviewing the following claims, one should appreciate that certain terms used therein may include meanings that are somewhat expanded beyond the conventional usage of the word or words. For example, "spectral shapes" is meant to include not only continuous shapes but can also include discontinuous sections or even discrete points within its definition. "Set" can include many elements or a few as a single element. "Sources of spectral variation" will normally mean chemical constituents but can also mean other sources of spectral variation such as temperature/pH shifts, diffraction effects, spectrometer or system drift, sample insertion effects, chromatic aberrations, changes in spectrometers or spectrometer components, purge gas variations, changes in multi- and hyperspectral images, changes in spectral returns from a satellite image evoked by a change in the scanned real estate as the satellite passes over the scene, etc.

What is claimed is:

1. A method of forming a hybrid model of at least one known constituent or property in a set of samples comprising:
    (a) forming a classical least squares (CLS) calibration model of the at least one known constituent or property in the set of samples from reference values and measured responses to a stimulus of individual samples in the set of samples;
    (b) estimating a CLS prediction value of the at least one known constituent or property in the set of samples from the CLS calibration model by a CLS prediction model, wherein the CLS prediction model produces residual errors;
    (c) adding, as needed, spectral shapes representative of sources of signal variation not specifically modeled in step (a) to the CLS prediction model; and
    (d) passing the residual errors to an inverse analysis algorithm, to provide a hybrid model of the at least one known constituent or property in the set of samples.

2. The method of claim 1 wherein the inverse analysis algorithm is partial least squares, partial least squares 2, principle component regression, multiple linear regression, or continuum regression.

3. The method of claim 1 for additionally estimating a value of at least one known constituent or property of a sample further comprising:
    (e) measuring responses of the sample to the stimulus, using the CLS calibration model and the CLS prediction model and adding at least one spectral shape, as needed, to the CLS prediction model to estimate a CLS prediction value of the at least one known constituent or property of the sample and producing residual errors;
    (f) taking the residual errors produced in step (e) and inserting them into the inverse analysis algorithm of the hybrid model to estimate an inverse portion of the residual errors of the CLS prediction value; and
    (g) combining the CLS prediction value from step (e) and the inverse portion of the residual errors of the CLS prediction value from step (f) to form an estimate of the value of the at least one known constituent or property of the sample.

4. The method of claim 3 wherein the applicable steps are repeated for additional constituents or properties from the CLS calibration model that are present in the sample.

5. The method of claim 3 further comprising factor analyzing the residual errors and wherein the inverse analysis algorithm uses only those factor-analyzed residual errors that are most effective in estimating the value of the at least one known constituent or property in the sample.

6. The method of claim 3 further including identifying outliers having values outside an allowed statistical range of the hybrid model.

7. The method of claim 6 wherein the identifying is done by spectral F ratios, and Mahalonobis distances, or examination of spectral residuals.

8. The method of claim 3 wherein the estimate of the value represents a first class of the at least one known constituent or property in the set of samples, so long as the estimate of the value is within acceptable statistical limits.

9. The method of claim 3 wherein the inverse analysis algorithm is partial least squares, partial least squares 2, principal components regression, inverse lease squares, multiple linear regression, or continuum regression.

10. The method of claim 1 further including performing a cross-validation to select a preferred number of residual errors for passing to the inverse analysis algorithm of the hybrid model.

11. The method of claim 1 wherein the reference values are selected to distinguish classes of samples in the set of samples and the method of forming the hybrid model includes a further step of classifying whether or not the at least one known constituent or property in the set of samples is within a first class.

12. The method of claim 1 further including factor analyzing the residual errors from step (b) to select a preferred number of residual errors for passing to the inverse analysis algorithm in step (d).

13. The method of claim 1 further including identifying outliers having values outside an allowed range of the hybrid model.

14. The method of claim 13 wherein the identifying is done by spectral F ratios, Mahalonobis distances, or examination of concentration and spectral residuals.

15. A method for estimating a value of at least one known constituent or property of a sample utilizing a hybrid model comprising:
    (a) forming a classical least squares (CLS) calibration model of the at least one known constituent or property in a set of samples from reference values and measured responses to a stimulus of individual samples in the set of samples;
    (b) estimating a CLS prediction value of the at least one known constituent or property in the set of samples from the CLS calibration model by a CLS prediction model, wherein the CLS prediction model produces residual errors;
    (c) adding, as needed, spectral shapes representative of sources of signal variation not explicitly modeled in step (a) to the CLS prediction model;
    (d) passing the residual errors for step (b) to an inverse analysis algorithm, to provide a hybrid model of the at least one known constituent or property in the set of samples;

(e) measuring responses of a sample to the stimulus, using the CLS calibration model and the CLS prediction model and adding at least one spectral shape, as needed, to the CLS prediction model of the hybrid model to estimate a CLS prediction value of the at least one known constituent or property of the sample and producing residual errors;

(f) taking the residual errors produced in step (e) and inserting them into the inverse analysis algorithm to estimate an inverse portion of the residual errors of the CLS prediction value; and (g) combining the CLS prediction value from step (e) and the inverse portion of the residual errors of the CLS prediction value from step (f) to form an estimate of the value of the at least one known constituent or property of the sample.

16. The method of claim 15 further including performing a cross-validation to select a preferred number of residual errors for passing to the inverse analysis algorithm.

17. The method of claim 15 further including identifying outliers having values outside an allowed range of the hybrid model.

18. The method of claim 17 wherein the identifying is done by spectral F ratios, concentration F ratios, Mahalonobis distances, or examination of concentration and spectral residuals.

19. The method of claim 15 wherein the reference values are selected to distinguish classes of samples in the set of samples and the method includes a further step of classifying whether or not the at least one known constituent or property in the set of samples is within a first class.

* * * * *